United States Patent
Zheng et al.

(10) Patent No.: US 11,264,663 B2
(45) Date of Patent: Mar. 1, 2022

(54) BATTERY COVER ASSEMBLY, SINGLE-CELL BATTERY, BATTERY MODULE, POWER BATTERY PACK, AND ELECTRIC VEHICLE

(71) Applicant: BYD COMPANY LIMITED, Guangdong (CN)

(72) Inventors: Weixin Zheng, Shenzhen (CN); Xi Shen, Shenzhen (CN); Jianhua Zhu, Shenzhen (CN); Luxia Jiang, Shenzhen (CN); Yan Zhu, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 361 days.

(21) Appl. No.: 16/499,790

(22) PCT Filed: Mar. 16, 2018

(86) PCT No.: PCT/CN2018/079237
§ 371 (c)(1),
(2) Date: Sep. 30, 2019

(87) PCT Pub. No.: WO2018/177135
PCT Pub. Date: Oct. 4, 2018

(65) Prior Publication Data
US 2020/0058908 A1 Feb. 20, 2020

(30) Foreign Application Priority Data

Mar. 31, 2017 (CN) .................. 201710210920.X

(51) Int. Cl.
*H01M 4/02* (2006.01)
*H01M 50/138* (2021.01)
(Continued)

(52) U.S. Cl.
CPC ............. *H01M 50/138* (2021.01); *B60K 1/04* (2013.01); *B60L 50/64* (2019.02); *H01M 50/26* (2021.01)

(58) Field of Classification Search
CPC ....................................................... H01M 4/02
See application file for complete search history.

(56) References Cited

U.S. PATENT DOCUMENTS

| 2011/0086261 | A1 | 4/2011 | Chun | |
| 2014/0377638 | A1* | 12/2014 | Kwak | H01M 50/35 429/178 |
| 2017/0047565 | A1 | 2/2017 | Byun et al. | |

FOREIGN PATENT DOCUMENTS

| CN | 101479865 A | 7/2009 |
| CN | 102136552 A | 7/2011 |

(Continued)

OTHER PUBLICATIONS

English Translation of International Search Report from PCT/CN2018/079237 dated Jun. 7, 2018 (2 pages).

(Continued)

*Primary Examiner* — Jacob B Marks
(74) *Attorney, Agent, or Firm* — Calfee Halter & Griswold LLP

(57) ABSTRACT

A battery cover assembly includes a cover plate, an electrode inner terminal and an electrode outer terminal. The electrode inner terminal is electrically connected to the electrode outer terminal through a current interrupt structure disposed on the cover plate. The current interrupt structure includes a sealed chamber configured to fill a gas-producing medium therein. The sealed chamber is configured to make the gas-producing medium to be electrically connected to positive electrodes and negative electrodes of a battery. When a voltage difference between the positive electrodes and negative electrodes of the battery exceeds a rated value, the gas-producing (Continued)

medium is capable of producing gas, to disrupt the electrical connection between the electrode inner terminal and the electrode outer terminal under the action of the pressure of the gas.

19 Claims, 14 Drawing Sheets

(51) Int. Cl.
*B60L 50/64* (2019.01)
*B60K 1/04* (2019.01)
*H01M 50/26* (2021.01)

(56) References Cited

FOREIGN PATENT DOCUMENTS

| | | |
|---|---|---|
| CN | 102468488 A | 5/2012 |
| CN | 103227343 A | 7/2013 |
| CN | 103999262 A | 8/2014 |
| CN | 204497281 U | 7/2015 |
| CN | 205790089 U | 12/2016 |
| EP | 2219247 A1 | 8/2010 |
| EP | 2911229 A1 | 8/2015 |
| WO | 2014064499 A1 | 5/2014 |

OTHER PUBLICATIONS

Search Report for European Patent Application No. 18776070.7 dated Mar. 31, 2020.

\* cited by examiner

BATTERY COVER ASSEMBLY, SINGLE-CELL BATTERY, BATTERY MODULE, POWER BATTERY PACK, AND ELECTRIC VEHICLE

CROSS-REFERENCE TO RELATED APPLICATIONS

This application is a 35 U.S.C. 371 U.S. national stage application entry of PCT/CN2018/079237, filed on Mar. 16, 2018, which claims priority to and benefits of Chinese Patent Application Serial No. 201710210920.X, filed with the State Intellectual Property Office of P. R. China on Mar. 31, 2017 and entitled "battery cover assembly, battery cell, battery module, power battery pack and electric vehicle". The entire contents of the above-referenced applications are incorporated herein by reference.

FIELD

The present application relates to the battery field, and specifically relates to a battery cover assembly, a battery cell using the battery cover assembly, a battery module including the battery cell, a power battery pack including the battery module and an electric vehicle including the power battery pack.

BACKGROUND

In the technical solution of a current interrupt device (CID), a battery is generally provided with a pull-apart structure capable of sensing gas pressure. In extreme cases such as thermal runaway, the reaction between an electrolytic solution and electrode materials produces a large amount of gas inside the battery. As the volume of gas increases, the pressure inside the battery increases, and the increased pressure causes a flip sheet in the pull-apart structure to flip outward, so that a fracture sheet which is partially thinned is pulled apart.

The prior art has the following three main disadvantages:

1. In the early stage of battery overcharging, a small quantity of gas is produced inside the battery, and the pull-apart structure cannot be broken in time.

2. When the pressure inside the battery is high, the battery is in thermal runaway, and the battery cannot be protected even if the pull-apart structure is broken.

3. When a pull-apart pressure of the battery is large, a starting pressure increases and the pull-apart structure cannot be broken in time; when the pull-apart pressure is small, the pull-apart structure may be broken in a case that the battery is injected with liquid and stored at high temperature.

The above structure is particularly not suitable for ternary materials. Due to high activity of the ternary materials, the battery is prone to be in thermal runaway in a short period of time in extreme cases. In the early stage of battery overcharging, as a small quantity of gas is produced inside the battery, the pressure is not enough to cause the flip sheet to be flipped to pull off the fracture sheet. When the pressure inside the battery is excessively high, the battery has been in a thermal runaway state, and in this case, although the circuit can be disconnected, the reactions between the materials inside the battery cannot be stopped, and the battery still cannot be protected.

SUMMARY

An objective of the present disclosure is to provide a battery cover assembly, a battery cell using the battery cover assembly, a battery module including the battery cell, a power battery pack including the battery module and an electric vehicle including the power battery pack, which can improve the battery safety.

The present disclosure provides a battery cover assembly, including a cover plate, an electrode inner terminal and an electrode outer terminal, where the electrode inner terminal is electrically connected to the electrode outer terminal through a current interrupt structure mounted on the cover plate, the current interrupt structure includes a sealed chamber configured to fill a gas-producing medium therein, the sealed chamber is constructed to cause the gas-producing medium to be electrically connected to positive and negative electrodes of a battery, and when a voltage difference between the positive and negative electrodes of the battery exceeds a rated value, the gas-producing medium is capable of producing gas, to disrupt the electrical connection between the electrode inner terminal and the electrode outer terminal under the action of the pressure of the gas.

In some embodiments, the rated value is in a range of 4.5 V to 5 V.

In some embodiments, the gas-producing medium includes at least one of biphenyl, tert-amylbenzene, cyclohexylbenzene, terphenyl, cyclohexyl biphenyls or dibenzofuran.

In some embodiments, the battery cover assembly includes a first polar member and a second polar member respectively in contact with the gas-producing medium, one of the first polar member and the second polar member is configured to connect to the positive electrode of the battery and the other is configured to connect to the negative electrode of the battery, the first polar member is formed by the electrode inner terminal and insulated from the cover plate, and the second polar member is connected in a sealed and insulating manner to the cover plate.

In some embodiments, the current interrupt structure further includes a flipping member configured to serve as a part of a chamber wall of the sealed chamber, the electrode inner terminal and the electrode outer terminal are electrically connected to each other through the flipping member, and under the action of the pressure of the gas, the flipping member acts to disrupt the electrical connection between the electrode inner terminal and the electrode outer terminal.

In some embodiments, a conductive member is fixed on an outer end surface of the electrode inner terminal, the flipping member is electrically connected to the conductive member, the conductive member is provided with a notch which can be broken under the action of the pressure of the gas, and the notch is disposed surrounding a connection point configured to connect to the flipping member.

In some embodiments, one of the flipping member and the conductive member is provided with a boss and the other one is provided with a connection hole configured to accommodate the boss, the boss being connected to the connection hole through an annular welding point.

In some embodiments, the electrode inner terminal is formed by a battery post extending along a medial-lateral direction, the flipping member is disposed coaxially with the battery post and radially extends outward from the battery post, and a side surface of the battery post is connected in a sealed and insulating manner to an outer periphery of the flipping member, so that the sealed chamber is formed as an annular cavity disposed around an axis of the battery post.

In some embodiments, an inner end portion of the battery post includes a radial flange, an outer end surface of the radial flange is sealedly connected with an inner insulation ring, and the cover plate is sealedly connected to an outer end surface of the inner insulation ring so as to be insulated from the battery post.

In some embodiments, the radial flange is provided with a medium injection hole configured to communicate with the annular cavity.

In some embodiments, the outer end surface of the radial flange is formed as a step structure, the step structure includes an inner ring close to the axis of the battery post and an outer ring away from the axis of the battery post, a thickness of the inner ring is greater than a thickness of the outer ring, the inner insulation ring is fixed to the outer ring, and the medium injection hole extends from an inner end surface of the radial flange to the inner ring.

In some embodiments, the second polar member is formed as an annular conductive sheet surrounding the annular cavity, an inner end surface of the annular conductive sheet is sealed connected with a first outer insulation ring, the cover plate is sealed connected to an inner end surface of the first outer insulation ring so as to be insulated from the annular conductive sheet, an outer end surface of the annular conductive sheet is sealed connected with a second outer insulation ring, and the outer periphery of the flipping member is sealed connected to an outer end surface of the second outer insulation ring so as to be insulated from the annular conductive sheet.

In some embodiments, the outer end surface of the second outer insulation ring is sealed connected with a seal ring, the outer periphery of the flipping member is sealed connected to the seal ring, the flipping member is further covered by a cover member, and the cover member is electrically connected to the flipping member to form the electrode outer terminal.

In some embodiments, the cover member is provided with a vent hole communicating with the outside.

The present disclosure further provides a battery cell, including a housing and a cell accommodated in the housing, where the battery cell further includes the battery cover assembly of the present disclosure, the cover plate packages the housing, and the cell is electrically connected to the electrode inner terminal.

The present disclosure further provides a battery module, including the battery cell of the present disclosure disposed therein.

The present disclosure further provides a power battery pack, including a pack body and a battery module disposed inside the pack body. The battery module is the battery module of the present disclosure.

The present disclosure further provides an electric vehicle, equipped with the power battery pack of the present disclosure.

By means of the above technical solutions, gas production in the sealed chamber in the cover assembly is independent of gas production inside the battery, so that gas pressure can be formed for the current interrupt structure in time to activate the current interrupt structure in time, thereby improving the battery safety.

Other features and advantages of the present disclosure are described in detail in the Detailed Description part below.

BRIEF DESCRIPTION OF THE DRAWINGS

The accompanying drawings are used to provide a further understanding of the present disclosure, constitute a part of this specification, and are used, together with the following specific implementations, to explain the present disclosure, but do not constitute limitations to the present disclosure. In the accompanying drawings.

DETAILED DESCRIPTION

Figure 1:
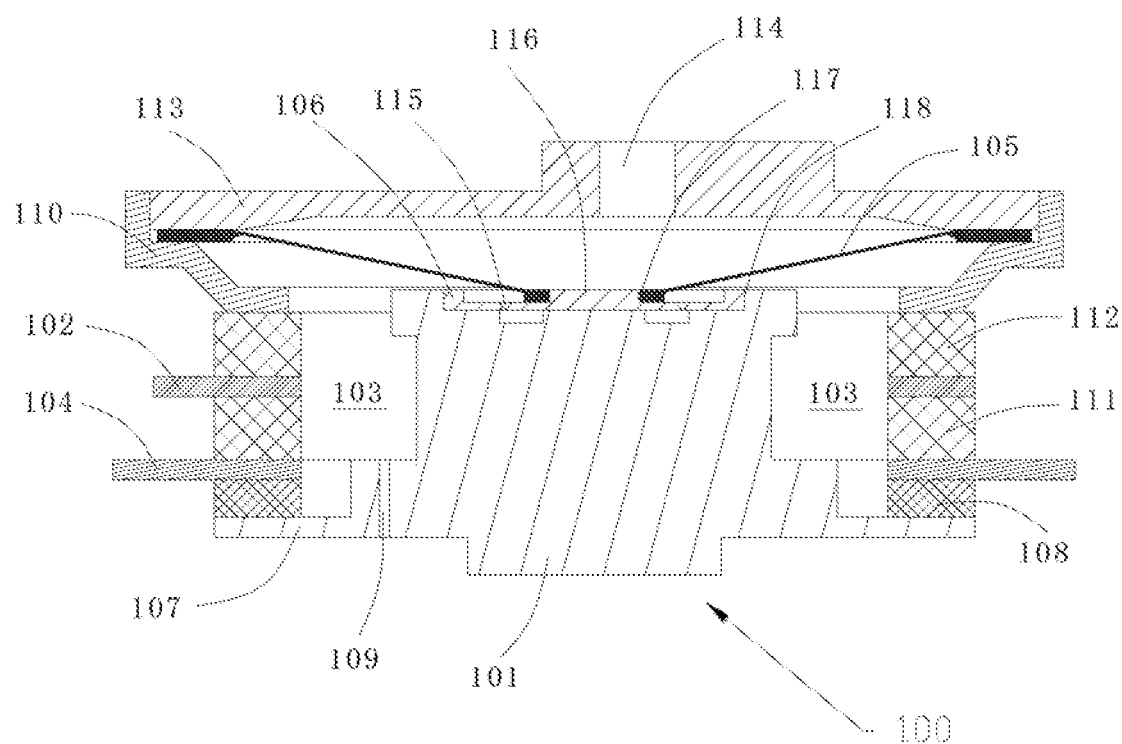
FIG. 1 is a schematic cross-sectional view of a current interrupt structure according to a first implementation of the present disclosure.

Specific implementations of the present disclosure are described in detail below with reference to the accompanying drawings. It should be understood that the specific implementations described herein are merely used to describe and explain the present disclosure rather than limiting the present disclosure.

Unless otherwise specified, nouns of locations such as "up, down, left, and right" used in the present disclosure are generally defined based on figure plane directions of corresponding accompanying drawings, and "inside and outside" refers to an inner part and an outer part of a corresponding component. Outer end, inner end, medial-lateral direction mentioned in this specification, for example, inner terminal, outer terminal, inner end surface, and outer end surface, are described in an axial direction of a battery post relative to inside and outside of a battery, and "inside and outside" of a ring piece, for example, outer periphery, outer ring, and inner ring, is defined in a radial direction relative to the center of the ring piece.

As shown in FIG. 1 to FIG. 25, the present disclosure provides technical solutions of a battery cover assembly, a battery cell using the battery cover assembly, a battery module using the battery cell, a power battery pack using the battery module, and an electric vehicle using the power battery pack. The battery cover assembly is disposed on the battery cell, and a plurality of battery cells are connected in series or in parallel to form the battery module, and can be placed in the battery pack to form the power battery pack. Moreover, in addition to the field of power battery packs, various technical solutions provided in the present disclosure may be further widely applied to other battery fields. In addition, the battery cover assembly in the present disclosure may be an assembly which can be assembled on a housing of the battery cell to form the battery cell, or a local structure that forms an inseparable overall structure with other parts such as a cell in the battery cell, which is not limited in the present disclosure and both fall within the protection scope of the present disclosure.

To make the technical solutions of the present disclosure clear, seven kinds of implementations are described in the present disclosure. However, the present disclosure is not limited to these seven implementations, and the features in each implementation can be continuously combined or replaced. In various possible implementations of the present disclosure, the battery cover assembly may include a cover plate and an electrode terminal mounted on the cover plate, and the electrode terminal further includes an electrode inner terminal and an electrode outer terminal, where the electrode inner terminal is electrically connected to a cell, and the electrode outer terminal is connected to other battery cells or battery modules, to achieve current input and output of the cell of the battery cell. For safety purposes, the electrode inner terminal is electrically connected to the electrode outer terminal through a current interrupt structure, and the current interrupt structure can be pulled apart under the action of gas pressure, thereby disconnecting the input and output of the current of the battery cell. The cover assembly provided in the present disclosure has a gas generation mechanism that is independent of the inside of the battery, to create gas pressure for the current interrupt structure by generating gas in time, so that the current interrupt structure can be pulled apart in time and the battery safety is improved.

In different implementations, to generate gas, a gas-producing medium is stored in the battery cover assembly in advance, for example, a sealed chamber is established to store the gas-producing medium, and the gas-producing medium is located in the middle of positive and negative electrodes of the battery, that is, a voltage is created for the gas-producing medium. In a case that the battery is overcharged, a voltage difference between the positive and negative electrodes of the battery will gradually increase. In this case, if the gas-producing medium is designed to produce gas when the voltage difference between the positive and negative electrodes of the battery exceeds a rated value, the electrical connection of the current interrupt structure between the electrode inner terminal and the electrode outer terminal can be disrupted in time under the action of the gas pressure of the gas.

Specifically, the rated value may be set as an operating voltage of the battery in the early stage of thermal runaway, that is, the rated value is set to be lower than a decomposition voltage of electrolytic solution in the battery. For example, the rated value may be in a range of 4.5 V to 5 V. Therefore, when the battery cell is in a normal state, the voltage difference generated by the gas-producing medium does not exceed the rated value, so that the gas-producing medium does not react and does not generate gas, and the battery cell can charge and discharge normally. When the battery cell is about to approach a dangerous state, for example, the battery is in the early stage of thermal runaway, the voltage difference generated by the gas-producing medium exceeds the rated value, so that the gas-producing medium can decompose to generate a large amount of gas, and the current interrupt structure is pulled apart under the action of the pressure of the gas, thereby disconnecting the input or output of the current of the battery in time. Specifically, the structure of any component or the electrical connection relationship between any two neighboring components in the current interrupt structure may be disconnected or disrupted.

Therefore, the battery cover assembly provided in the implementations of the present disclosure can ensure that the current of the battery can be quickly cut off in the early stage of overcharging, which is particularly applicable to electrode materials with high activity (for example, ternary materials). Compared with the method of adding gas-producing additive to the electrolytic solution of the battery, the gas-producing medium provided in the present disclosure does not contact the positive and negative electrode materials and the electrolytic solution of the battery, does not have side reactions, and has no adverse effect on the capacity and life of the battery. In addition, the amount of the gas-producing medium used is small, far less than the electrolytic solution of the battery, thereby further improving the battery safety.

In the implementations of the present disclosure, to make the decomposition voltage of the gas-producing medium be in a range of 4.5 V to 5 V and make the gas-producing medium generate a large amount of gas when being lower than the decomposition voltage of the electrolytic solution, the gas-producing medium may specifically include at least one of biphenyl (decomposition voltage: 4.5 V), tert-amyl-benzene (decomposition voltage: 4.7 V), cyclohexylbenzene (decomposition voltage: 4.7 V), terphenyl (decomposition voltage: 4.5 V), cyclohexyl biphenyls (decomposition voltage: 4.5 V), and dibenzofuran (decomposition voltage: 4.5 V).

Further, to increase the decomposition rate of the gas-producing medium and improve the sensitivity of the current interrupt structure in interrupting the current, the above gas-producing medium and lithium salts (for example, $LiPF_6$) may be dissolved as solutes into organic solvents when used, for example, be dissolved into dimethyl carbonate (DMC) solvent. Since the lithium salts increase conductivity, the decomposition rate of the gas-producing medium is greatly improved and the sensitivity of the current interrupt structure in interrupting the current is increased. The lithium salts, the DMC, and the gas-producing medium may be mixed and filled into a sealed chamber 103 at any appropriate proportion. Preferably, if the volume of the sealed chamber 103 is 100%, the content of the lithium salts is 5% to 30%, and the content of the DMC is 5% to 30%. In addition, the solution including lithium salts, gas-producing medium, and organic solvents has a certain thermal conductivity, and can reduce the heat and overcurrent temperature rise at the connection point between two neighboring components in the current interrupt structure that the current needs to flow through. When an instantaneous high current appears in the battery during use, the heat transfer effect of the solution is particularly obvious, thereby further improving the battery safety. In addition, the gas-producing medium has a certain gas-producing temperature. For example, when the battery is externally short-circuited, accumulated heat can also cause the gas-producing medium to produce gas, and the pressure inside the sealed chamber is increased, so that the current transfer of the battery is interrupted by the mechanical structure and the overcurrent protection is achieved. It should be noted that the above solution is not limited to liquid, but may also be a sol, for example, may be a gel solution.

In the implementations of the present disclosure, the current interrupt structure may be a mechanical structure capable of sensing gas pressure. Specifically, when the battery is in the early stage of thermal runaway, the mechanical structure can interrupt the current that flows through the mechanical structure under the action of the pressure of the gas generated by the gas-producing medium. Specifically, connections between internal components may be disrupted to stop the current transfer, thereby stop charging/discharging of the battery in a timely manner. The gas-producing medium may generate gas in various ways. For example, when the battery is in the early stage of overcharging, the gas-producing medium generates gas under the action of the voltage difference between the positive and negative electrodes of the battery, which in turn increases the pressure inside the battery, or when the battery is abnormal during use and the battery temperature rises, for example, when the current is externally short-circuited, since the gas-producing medium has a certain gas-producing temperature, heat accumulated during the short circuiting of the battery can also cause the gas-producing medium to produce gas, thus generating the gas pressure power that drives the current interrupt structure.

In addition, the implementations of the present disclosure further provide a battery cell. The battery cell includes a housing, a cell accommodated in the housing, and the battery cover assembly in the present disclosure. The cover plate is configured to encapsulate the housing, and the cell is connected to a corresponding electrode terminal, to establish input and output current paths of the corresponding battery cell. In the electrode terminal equipped with a current interrupt structure, the cell is connected to an electrode inner terminal by means of an internal lead-out piece. In the implementations of the present disclosure, the electrode terminal without the current interrupt structure may be electrically connected to the cover plate, and the cover plate can be used to establish a voltage of one of electrodes for a gas-producing medium in a sealed chamber, that is, a manner in which the cover plate is electrified, for example, the second implementation. In addition, the electrode terminal without the current interrupt structure may also be directly electrically connected to the gas-producing medium in the sealed chamber by a connector of a conducting strip to establish the voltage of one of the electrodes, for example, the first implementation in which the cover plate is not electrified. In addition, the implementations further provide a battery module using the battery cell, a power battery pack using the battery module, and an electric vehicle using the power battery pack.

The present disclosure introduces battery cover assemblies 100, 200, 300, 400, 500, 600, and 700 mentioned in the first to seventh implementations in combination with the corresponding drawings.

Figure 2:
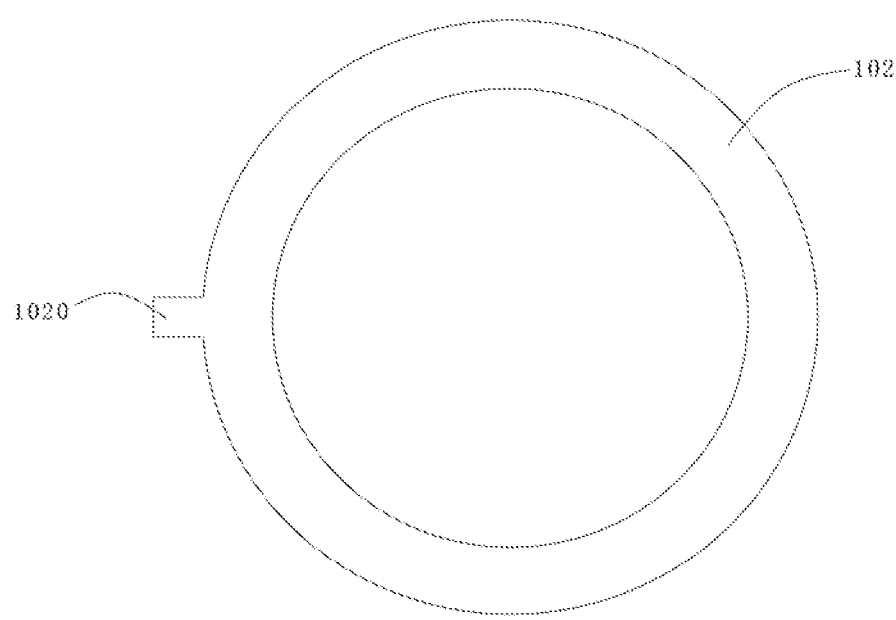
FIG. 2 is a schematic structural top view of a second polar member according to the first implementation of the present disclosure.

First, as shown in FIG. 1 to FIG. 2, in the first implementation of the present disclosure, the battery cover assembly 100 includes a sealed chamber 103 configured to fill the gas-producing medium therein, the sealed chamber 103 is constructed to cause the gas-producing medium to be electrically connected to positive and negative electrodes of a battery, and when a voltage difference between the positive and negative electrodes of the battery exceeds a rated value, the gas-producing medium is capable of producing gas, so that the electrical connection of a current interrupt structure between the electrode inner terminal and the electrode outer terminal is disrupted under the action of the pressure of the gas, to improve the security of the battery.

The battery cover assembly includes a first polar member 101 and a second polar member 102 respectively in contact with the gas-producing medium. One of the first polar member 101 and the second polar member 102 is configured to connect to the positive electrode of the battery and the other is configured to connect to the negative electrode of the battery, that is, a voltage difference may be established for the gas-producing medium through the two polar members. In this implementation, the first polar member 101 is formed by the electrode inner terminal and insulated from a cover plate 104, and the second polar member 102 is connected in a sealed and insulating manner to the cover plate 104. That is, in this implementation, through the electrode inner terminal and the additional second polar member, a voltage may be established for the gas-producing medium, in this case, through the additional second polar member, the cover plate 104 does not need to be electrified, so as to extend the life of the cover plate 104, and improve the security of the battery.

Taking the first implementation in FIG. 1 and FIG. 2 as an example, in this implementation, the current interrupt structure further includes a flipping member 105 configured to serve as a part of a chamber wall of the sealed chamber 103, the electrode inner terminal and the electrode outer terminal are electrically connected to each other through the flipping member 105, and under the action of the pressure of the gas, because the gas starts to accumulate in the sealed chamber 103, and the pressure of the gas rises, the flipping member 105 serving as the chamber wall of the sealed chamber 103 acts to disrupt the electrical connection between the electrode inner terminal and the electrode outer terminal. Specifically, the flipping member 105 may act to disrupt the electrical connection between the flipping member 105 and the electrode inner terminal, or may disrupt the electrical connection between the flipping member 105 and the electrode outer terminal, or disrupt the structure of the flipping member 105. In this implementation, that is, the flipping member 105 acts to disrupt the electrical connection between the flipping member 105 and the electrode inner terminal.

In different implementations of the present application, the electrical connection between the flipping member and the electrode inner terminal may be disrupted in different manners, for example, by disrupting a conductive structure between a conductive member and the flipping member, or by disrupting a structure of at least one of the flipping member and the electrode inner terminal. In this implementation, to facilitate processing of the electrode inner terminal, a conductive member 106 is fixed on an outer end surface of the electrode inner terminal, the flipping member 105 is electrically connected to the conductive member 106. In this case, some fracture structure may be disposed on the conductive member 106, to avoid cumbersome processing on the electrode inner terminal. For example, the conductive member 106 may be provided with a notch 115 which can be broken under the action of the pressure of the gas, and the notch 115 is disposed surrounding a connection point configured to connect to the flipping member 105.

In this way, under the action of the pressure of the gas, the structure of the conductive member 106 is disrupted along the notch 115, so that the connection between the flipping member 105 and the electrode inner terminal is disrupted. In addition to implementations where the structure is disrupted through weakening manners such as a notch, the electrical connection may be disrupted by means such as extracting a welding point between the flipping member 105 and the electrode inner terminal. Alternatively, the electrical connection may be disrupted by pulling a fracture sheet connecting between the flipping member 105 and the electrode inner terminal apart. Specifically, details are described in the following fifth implementation of the present disclosure. Therefore, according to the present disclosure, the current transfer can be interrupted by disconnecting the mechanical structure under the action of the pressure of the gas.

In this way, taking the first implementation as an example, for example, when the battery is at the early stage of overcharging, the gas-producing medium produces the gas under the action of the voltage difference between the first polar member (the electrode inner terminal) and the second polar member, so that the pressure of the gas in the sealed chamber 103 rises. In this case, under the certain action of the pressure of the gas, the flipping member 105 causes the conductive member 106 to be disrupted along the notch through a flipping action, so that the electrical connection between the electrode inner terminal and the electrode outer terminal is disrupted, so as to interrupt a circuit connection between a battery cell and the outside, and stop charging the battery, thereby avoiding that the pressure of the gas keeps rising because of the decomposition of an electrolytic solution inside the battery, which ensures the security of the battery.

As shown in FIG. 1, in this implementation, the electrode inner terminal serving as the first polar member 101 is formed by a battery post extending along a medial-lateral direction, and the conductive member 106 is connected to the outer end surface of the battery post, for example, through welding, to be electrically connected to each other. Specifically, for example, the battery post may be electrically connected to a cell though an internal lead-out piece, a current conductive sheet, and the like, to achieve the connection of the first polar member 101 to the positive electrode or the negative electrode of the battery. In addition, because the battery generally establishes a current loop with an external circuit through the battery post disposed through the cover plate, a mechanical structure that is formed by the conductive member 106 and the flipping member 105 and that may sense the pressure of the gas is disposed on the battery post, so that the pressure of the gas in the sealed chamber 103 may be directly sensed through the battery post, providing high sensibility, and the connection of the mechanical structure to the battery post is avoided, facilitating processing.

In the present disclosure, the manner in which the sealed chamber is formed may vary in different implementations. The sealed chamber may be formed by surrounding the first polar member, the second polar member and/or the mechanical structure configured to sense the pressure of the gas. That is, the first polar member and the second polar member not only can serve as positive and negative electrodes applied to the gas-producing medium, but also can help form the sealed chamber; correspondingly, the mechanical structure that may sense the pressure of the gas may also be used for two purposes, which may be configured to disrupt current input or current output of the battery, and may help form the sealed chamber, so as to reduce the number of parts of the battery cell and reduce costs. In addition, the sealed chamber may further be independently formed by additional parts, for example, a sealed cavity formed in a package may be served as the sealed chamber.

When the mechanical structure sensing the pressure of the gas is configured to define the sealed chamber, when the battery is at the early stage of thermal runaway and a normal state, part of the chamber wall of the sealed chamber is always in contact with the mechanical structure to form the closed sealed chamber. When the sealed chamber is not formed by surrounding the mechanical structure sensing the pressure of the gas, only when the battery is at the early stage of thermal runaway, under the action of the pressure of the gas produced by the gas-producing medium, the mechanical structure is in contact with the chamber wall of the sealed chamber, and when the battery is in the normal state, the mechanical structure is always separated from the chamber wall of the sealed chamber.

In the first implementation of the present disclosure, the flipping member 105 is disposed coaxially with the battery post and radially extends outward from the battery post, and a side surface of the battery post is connected in a sealed and insulating manner to an outer periphery of the flipping member 105, so that the sealed chamber 103 is formed as an annular cavity disposed around an axis of the battery post.

Consequently, when the pressure of the gas in the sealed chamber 103 rises, the flipping member 105 acts to disrupt the electrical connection with the battery post. The connection of the battery post to the flipping member in the sealed and insulating manner may be achieved by means of structures of the battery post and the flipping member, or may be achieved by means such as adding an insulation ring or a sealing member. In this way, an existing battery structure can be reasonably and fully used, so as to interrupt the current in time at the early stage of overcharging of the battery while making as few improvements to applied to the existing battery structure as possible.

Specifically, in this implementation, the first polar member 101 (the electrode inner terminal, or called the battery post), the second polar member 102, the flipping member 105 and the conductive member 106 are all configured to define the sealed chamber 103. As shown in FIG. 1, to prevent the cover plate 104 from being electrified, the battery post needs to be insulated from the cover plate when the battery post is securely connected to the cover plate. Specifically, the cover plate 104 and an inner end portion of the battery post includes a radial flange 107, an outer end surface of the radial flange 107 is sealedly connected with an inner insulation ring 108, and the cover plate 104 is sealedly connected to an outer end surface of the inner insulation ring 108, so as to be insulated from the battery post. That is, in FIG. 1, the inner insulation ring 108 is located at a lower side of the cover plate.

The insulation ring may be made of ceramics or plastics. When the insulation ring is made of ceramics, the radial flange 107 and the inner insulation ring 108 may be connected through ceramic welding, and the inner insulation ring 108 and the cover plate may be connected through ceramic welding. This achieves higher reliability and durability than insulation achieved by using plastics or rubber, and not only stable and tight connection of the current interrupt structure can be achieved, but also insulation between the battery posts and the cover plate can be achieved. When the insulation ring is made of plastics, the plastics may be integrally formed on the battery post through an injection molding technology, thereby reducing assembly time.

To facilitate the injection of the gas-producing medium into the formed annular cavity, in the first implementation of the present disclosure, as shown in FIG. 1, the radial flange 107 is provided with a medium injection hole 109 configured to communicate with the annular cavity. That is, the gas-producing medium may be filled in to the sealed chamber 103 at an inner end of the battery post. During assembly, first the first polar member 101, the second polar member 102, the inner insulation ring 111, the outer insulation ring 112, the conductive member 106 and the flipping member 105 are mounted on the cover plate, to define a closed annular cavity. Then the gas-producing medium is injected into the annular cavity from the inner end of the battery post through the medium injection hole 109, and then the medium injection hole 109 is sealed. Specifically, the medium injection hole may be blocked by using a sealing plug such as a bead, or a blocking member such as a round bar may be welded into the medium injection hole. At last, the cover plate equipped with the current interrupt structure is mounted on the battery. In other implementations, the medium injection hole may be designed on one side of the flipping member, so that the gas-producing medium can be injected into the sealed chamber from an outer end of the battery post. Details are described in the second implementation.

Further, as shown in FIG. 1, to improve the structural strength of the radial flange 107 to further improve the firmness of the connection between the battery post and the cover plate, the outer end surface of the radial flange 107 is formed as a step structure. The step structure includes an inner ring close to the axis of the battery post and an outer ring away from the axis of the battery post. A thickness of the inner ring is greater than a thickness of the outer ring. The thickness refers to a size along an extending direction of the battery post. The inner insulation ring 108 is fixed to the outer ring, and the medium injection hole 109 extends from an inner end surface of the radial flange 107 to the inner ring. By designing the step structure, a contact area of the gas-producing medium and the outer surface of the battery post is increased, the gas production sensibility is improved, and in addition, the strength of the battery post can be ensured when the radial flange 107 is designed.

Provided that the structure strength of the radial flange 107 is enough reliable, the inner insulation ring 108 is fixed in an area with a small thickness of the radial flange 107, to form an annular cavity with greater volume, so that the gas-producing medium filled in the annular cavity is as much as possible, to improve the sensibility of the current interrupt structure. In addition, compared to the formation of the medium injection hole 109 in the area with a small thickness of the radial flange 107, the formation of the medium injection hole 109 in the inner ring with greater thickness of the radial flange 107 can extend the depth of the medium injection hole 109, and makes it easier to achieve the reliable sealing of the medium injection hole 109 after the gas-producing medium is injected into the sealed chamber.

As shown in FIG. 1 and FIG. 2, in this implementation, the second polar member 102 is formed as an annular conductive sheet surrounding the annular cavity, an inner end surface of the annular conductive sheet is sealedly connected with a first outer insulation ring 111, and the cover plate 104 is sealedly connected to an inner end surface of the first outer insulation ring 111 so as to be insulated from the annular conductive sheet. Similar to the inner insulation ring, the first outer insulation ring 111 may also be made of ceramics or plastic. The processing technology for securely connecting the first outer insulation ring 111 to neighboring parts is the same as that for the inner insulation ring, both of which may be implemented through ceramic welding or injection molding, so details are not described herein again. Further, as shown in FIG. 2, to facilitate the electrical connection of the annular conductive sheet serving as the second polar member 102 to parts with an opposite polarity such as another battery post of the battery, a convex tab 1020 is further disposed on the annular conductive sheet, and specifically, the tab 1020 may be integrally formed on the annular conductive sheet.

Further, to achieve the operation of the current interrupt structure, as shown in FIG. 1, an outer end surface of the annular conductive sheet is sealedly connected with a second outer insulation ring 112, and the outer periphery of the flipping member 105 is sealedly connected to an outer end surface of the second outer insulation ring 112 so as to be insulated from the annular conductive sheet. In this way, insulation between the outer periphery of the flipping member 105 and the annular conductive sheet with an opposite polarity may be achieved, so as to prevent the battery from shorting, the flipping member 105 may further sense the action of the pressure of the gas, so as to use the outer periphery of the flipping member 105 as a support point to flip to disrupt the electrical connection with the conductive member 106, and timely disrupt current input and output of the battery. Similarly, the material of the second outer insulation ring 112 and the first outer insulation ring 111 may be the same, and the shapes of the second outer insulation ring 112 and the first outer insulation ring 111 may be the same. The processing technology for securely connecting the second outer insulation ring 112 to neighboring parts is the same as that for the first outer insulation ring 111, so details are not described herein again.

In this implementation, as shown in FIG. 1, the outer end surface of the second outer insulation ring 112 is sealedly connected with a seal ring 110, the outer periphery of the flipping member 105 is sealedly connected to the seal ring 110, that is, the flipping member 105 is connected to the second outer insulation ring 112 through the seal ring 110, so that the sealing of the sealed chamber 103 is ensured, so as to cause the pressure of the gas in the sealed chamber may act on the flipping member without leaking the gas. In addition, the seal ring may be configured as a conductive ring, so that a current loop may be established between the flipping member and the outside through the seal ring, that is, in this case, the seal ring 110 may serve as the electrode outer terminal in this implementation.

Further, to protect the current interrupt structure when a stable seal assembly of the flipping member is achieved, the battery cover assembly further includes a cover member 113 that sealedly connects the outer periphery of the flipping member 105 to the seal ring 110. The cover member may be made of a conductive material such as metal, that is, the electrode outer terminal in this implementation is formed through the cover member 113, and specifically, a protrusion connected to a conductive transmission member such as an electrode lead-out plate may be formed on the outer end surface of the cover member 113. The electrode lead-out plate may establish a current path, for example, between neighboring battery cells or between neighboring battery modules.

In the implementations of the present disclosure, as shown in FIG. 1, the first implementation is taken as an example, to achieve the gas release, the cover member 113 is provided with a vent hole 114 communicating with the outside, so that the gas in the sealed chamber may be released after the electrical connection between the flipping member and the conductive member is disrupted, so as to prevent the battery from exploding. Moreover, the vent hole in the cover member may further enable the current interrupt structure to have a pressure difference with the atmospheric air directly, so that an action of the flipping member is achieved.

To achieve stable connection between the seal ring and the flipping member, the cover member 113 is formed as a covering cap structure, and the outer end surface of the seal ring 110 is provided with an L-shaped rabbet, where the inner end surface of the L-shaped rabbet is configured to connect the second outer insulation ring 112. The outer periphery of the flipping member 105 is embedded in and supports the L-shaped rabbet. In addition, the outer periphery is sealedly connected to the L-shaped rabbet by using a covering cap structure covering the flipping member 105. Therefore, when the cover member 113 achieves the stable seal assembly of the flipping member 105, the current interrupt structure can be protected.

In the various implementations of designing the flipping member and the conductive member of the present disclosure, because the current is large in fields such as a power battery pack, a welding structure of the conductive member 106 and the flipping member 105 needs to be stable, to prevent a large current from fusing the welding structure. In this way, in this implementation, as shown in FIG. 1, one of the flipping member 105 and the conductive member 106 is provided with a boss 116 and the other one is provided with a connection hole 117 configured to accommodate the boss 116, the boss 116 being connected to the connection hole 117 through an annular welding point. That is, for example, in this implementation, the boss 116 may be formed on the conductive member 106, and the connection hole 117 may be formed on the flipping member 105. The annular welding point herein refers to when the connection hole is sleeved outside the boss, the connection hole is entirely welded to the boss through the annular welding point, so that the welding stability and the sealing are provided. In this way, through a close contact between the boss and the connection hole, in one aspect, it is ensured that the annular welding point can stably weld the boss 116 included in the connection hole 117, and can increase the flow area of the current to ensure that a large current can pass. In another aspect, sealing between the connection hole 117 and the boss 116 may be improved, that is, when the conductive member and the flipping member together serve as part of the chamber wall of the sealed chamber 103, the sealing between the connection hole 117 and the boss 116 may be ensured by increasing the contact area between the connection hole 117 and the boss 116, so that the conductive member 106 may be more easily pulled apart from the notch 115. In some manners of other implementations, manners such as laser penetration welding may be used to weld the flipping member and the conductive member.

In the implementation of the present disclosure, as shown in FIG. 1, the first implementation is taken as an example, the manner that disrupts the electrical connection between the flipping member and the conductive member may be achieved by the notch. That is, a weak portion with less strength than other areas is produced in a corresponding part, where to finish a completely disruption between the conductive member and the flipping member, the notch is generally the connection point around the conductive member and the flipping member, for example, the annular structure of the boss welding structure. In this way, electrical disconnection is achieved through disconnection of the conductive member or the flipping member. The notch may be formed in the flipping member or may be formed in the conductive member. In an implementation, the conductive member 106 is provided with a notch 115. The notch 115 is disposed surrounding a connection point for connecting to the flipping member 105. That is, an annular notch is disposed in the conductive member 106 and surrounding the boss 116. In this way, when the inside pressure of the gas in the sealed chamber rises, the pressure may urge the notch 115 to be pulled apart, so that part of the conductive member 106 surrounded by the notch 115 is departed from the conductive member 106 with the flipping member 105, so as to achieve the disruption of the current. In another implementation, alternatively, the notch may be formed in the flipping member 105.

To ensure that the notch 115 on the conductive member 106 can still be pulled apart when the conductive member 106 is fixed to the battery post, as shown in FIG. 1, an outer end surface of the battery post is provided with an accommodation hole 118, and the outer periphery of the conductive member 106 is fixed to the inner wall of the accommodation hole 118. In this way, the conductive member 106 may be stably fixed through the annular periphery, and a region inside the notch 115 can be pulled apart under the action of an external force such as a tensile force of the flipping member 105 or the direct pressure of the gas because the region inside the notch 115 is not connected to the battery post.

The battery cover assembly and the battery cell provided by the first implementation of according to the present application is described above. Without departing from the concept of the present application, features in the first implementation, for example, the boss welding structure, the flipping member, and the insulation ring may all be applied to the implementations described in the present disclosure or other possible implementations, and the following describes the battery cover assembly provided by the second implementation of the present disclosure with reference to FIG. 3 to FIG. 6.

As shown in FIG. 3 to FIG. 6, a second implementation of the present disclosure provides a battery cover assembly 200, a current interrupt structure includes a sealed chamber 203 configured to fill a gas-producing medium therein, where the battery cover assembly further includes a first polar member 201 and a second polar member 202 which respectively come into contact with the gas-producing medium, one of the first polar member 201 and the second polar member 202 is connected to a positive electrode of a battery, and the other is connected to a negative electrode of the battery. When the voltage difference between the first polar member 201 and the second polar member 202 exceeds a rated value, the gas-producing medium is capable of producing gas, to disrupt an electrical connection between an electrode inner terminal and an electrode outer terminal under the action of the pressure of the gas. In this implementation, the first polar member 201 is formed by the electrode inner terminal and insulated from a cover plate, and the second polar member 202 is formed by a cover plate, which is a manner of electrifying the cover plate adopted in this implementation. The manner of electrifying the cover plate may be that the cover plate is electrically connected to another electrode terminal having no current interrupt structure. In this way, the existing component structure of the battery can be fully utilized, and no additional polar member needs to be used to apply a voltage difference to the gas-producing medium.

In this implementation, similar to the first implementation, the current interrupt structure further includes a flipping member 205 configured to serve as a part of a chamber wall of the sealed chamber 203, the electrode inner terminal and the electrode outer terminal are electrically connected to each other through the flipping member, and under the action of the pressure of the gas, the flipping member acts to disrupt the electrical connection between the electrode inner terminal and the electrode outer terminal. Specifically, the electrical connection between the flipping member and the electrode inner terminal, that is, the first polar member 201 may be disrupted.

The same as the first implementation, a conductive member 206 is fixed on an outer end surface of the electrode inner terminal, the flipping member 205 is electrically connected to the conductive member 206, the conductive member 206 is provided with a notch 215 which can be broken under the action of the pressure of the gas, and the notch 215 is disposed surrounding a connection point configured to connect to the flipping member 205, that is, the conductive member 206 is pulled apart to achieve the electrical connection between the flipping member 205 and the electrode inner terminal. Further, one of the flipping member and the conductive member is provided with a boss and the other one is provided with a connection hole configured to accommodate the boss, the boss being connected to the connection hole through an annular welding point, thereby improving the stability and sealing when the current flows.

Figure 3:
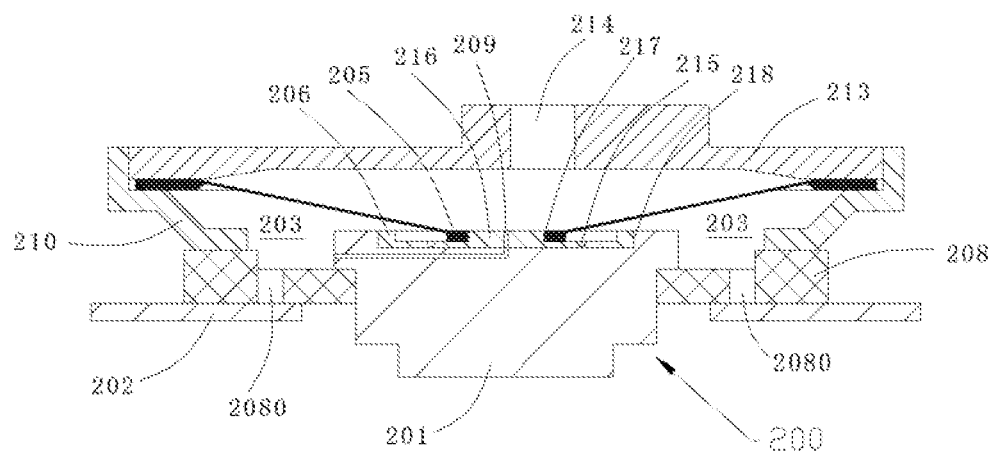
FIG. 3 is a schematic cross-sectional view of a current interrupt structure according to a second implementation of the present disclosure, where a voltage difference between a first polar member and a second polar member does not exceed a rated value.
Figure 6:
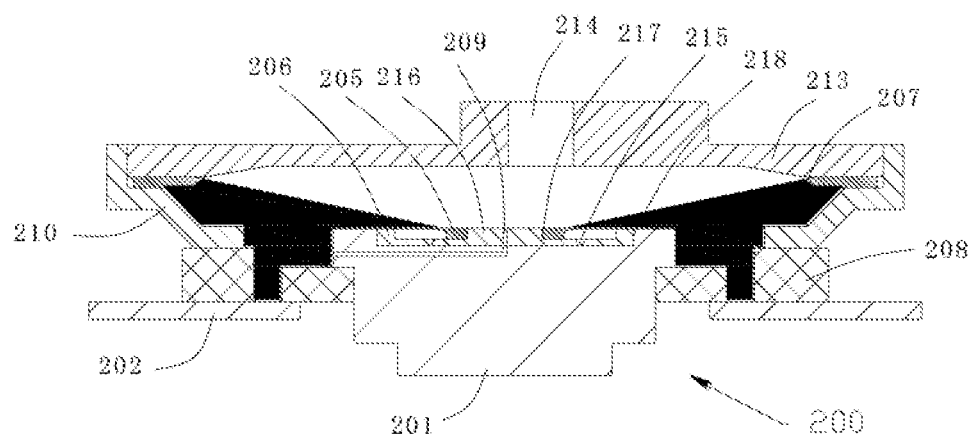
FIG. 6 is a schematic cross-sectional view of a current interrupt structure according to the second implementation of the present disclosure, where a sealed chamber is filled with a gas-producing medium.

In addition, in the second implementation of the present disclosure, the electrode inner terminal is formed by a battery post extending along a medial-lateral direction, and is connected in a sealed and insulating manner to the cover plate, the flipping member is disposed coaxially with the battery post and radially extends outward from the battery post, and a side surface of the battery post is connected in a sealed and insulating manner to an outer periphery of the flipping member, so that the sealed chamber is formed as an annular cavity disposed around an axis of the battery post. That is, in this implementation, similar to the first implementation, the first polar member (a battery post) 201, the second polar member 202, the flipping member 205 and the conductive member 206 are configured to enclose the sealed chamber 203. As shown in FIG. 3 and FIG. 6, a side surface of the battery post is connected in a sealed and insulating manner to an outer periphery of the flipping member 205, so that the sealed chamber 203 is formed as an annular cavity disposed around an axis of the battery post. In this way, an existing battery structure can be reasonably and fully used, so as to interrupt the current in time at the early stage of overcharging of the battery while making as few improvements to applied to the existing battery structure as possible.

To fill the gas-producing medium into the enclosed sealed chamber 203, in this implementation, a boss 216 and the battery post are provided with an end-to-end medium injection hole 209 communicating with the sealed chamber to inject the gas-producing medium into the annular cavity from an outer end of the battery post. Specifically, the medium injection hole 209 includes a first segment extending from the boss 216 in an axial direction of the electrode inner terminal, and a second segment extending from the first segment radially to a side wall of the battery post to communicate with a second segment of the sealed chamber 203. That is, the entire medium injection hole 209 is formed as a vertical L-shaped structure, and the conductive member has part of the first segment, and another part of the first segment and the second segment are formed on the battery post.

In addition, as shown in FIG. 3, in the second implementation, an accommodating hole 218 is formed on an outer end surface of the battery post, and an outer periphery of the conductive member 206 is fixed on an inner wall of the accommodating hole 218. In this way, the conductive member 206 can be stably fixed through the annular periphery, and a region inside the notch 215 can be pulled apart under the action of an external force such as a tensile force of the flipping member 205 or the direct pressure of the gas because the region inside the notch 215 is not connected to the battery post.

To facilitate processing, the medium injection hole 209 is substantially formed as an L-shaped through hole having a vertical segment and a horizontal segment. In this way, under the action of gravity, the solvent can quickly flow into the sealed chamber, thereby improving the assembly efficiency of the current interrupt structure.

Because the function of the cover plate is not completely the same as that in the first implementation, in the second implementation of the present disclosure, the cover plate is electrified, which may further serve as an electrode applied to the gas-producing medium. Specifically, as shown in FIG. 3 and FIG. 6, the current interrupt structure is fixed on the cover plate. As the second polar member 202, the cover plate is respectively connected in a sealed and insulating manner to the battery post and the outer periphery of the flipping member 205. In this way, because the cover plate can achieve the packaging function of the battery housing and may be used as an electrode which comes into contact with the gas-producing medium, thereby reducing the number of components in the current interrupt structure, and reducing the battery assembly time.

In this implementation, to further reduce the number of components in the current interrupt structure and make the overall structure of the current interrupt structure more compact, as shown in FIG. 3 to FIG. 6, an outer surface of the cover plate is further sealedly connected to an insulation ring 208, the outer periphery of the flipping member 205 and the side surface of the battery post are sealedly connected to the insulation ring 208 to be respectively insulated from the cover plate, and the outer periphery of the flipping member 205 is insulated from the battery post by using the insulation ring 208. That is, the annular cavity is defined jointly by the cover plate, the battery post, the flipping member 205, and the insulation ring 208. In the second implementation provided by the present disclosure, the current interrupt structure can realize, through the single insulation ring 208, the insulation and sealing connection between the battery post and the cover plate, the cover plate and the outer periphery of the flipping member, and the outer periphery of the flipping member and the battery post, thereby significantly reducing the number of components in the current interrupt structure, reducing the battery assembly time, and improving the compactness of the entire structure of the current interrupt structure. In addition, the manufacturing material of the insulation ring 208 and the process of fixedly connecting the insulation ring 208 to a neighboring component are the same as that of the insulation ring in the first implementation, so details are not described herein again.

To prevent the seal ring from being electrically connected to the battery post to cause the loss of the current interruption function after the conductive member is disconnected from the flipping member, as shown in FIG. 3 and FIG. 6, an outer end surface of the insulation ring 208 is formed as a step structure having an inner ring and an outer ring, and the side surface of the battery post is provided with an L-shaped rabbet embedded in and supporting the inner ring, thereby ensuring that the insulation ring 208 is stably fixed on the battery post. The outer periphery of the flipping member 205 is sealedly connected to the outer ring so as to be insulated from the battery post, that is, the battery post is insulated from the seal ring 210 through the insulation ring 208. In addition, the sealed connection of the seal ring 210 to the insulation ring 208 can seal the outer periphery of the flipping member, so that the internal pressure of the sealed chamber can act on the flipping member without leaking.

Figure 4:
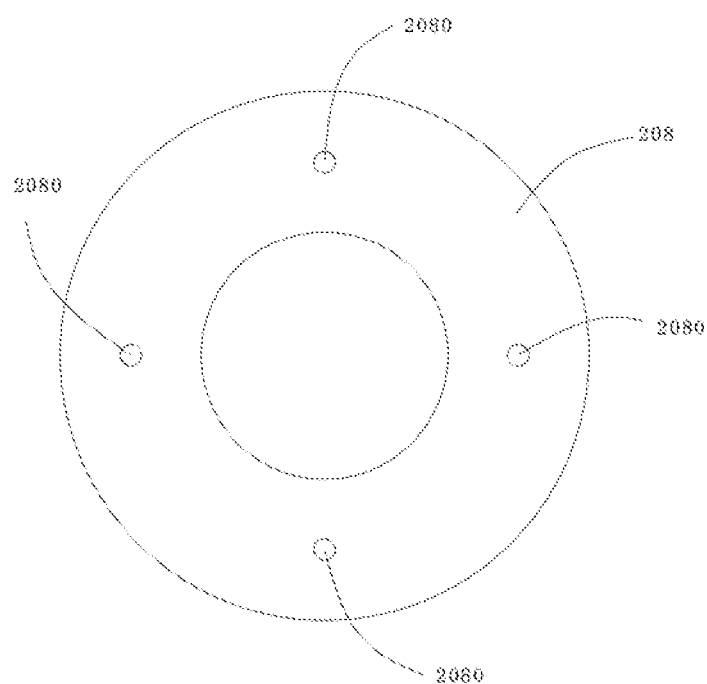
FIG. 4 is a schematic structural top view of an insulation ring according to the second implementation of the present disclosure.

Further, to ensure that when the insulation ring 208 is respectively insulated from the battery post and the outer periphery of the flipping member, the cover plate may further come into contact with the gas-producing medium 207, as shown in FIG. 3 and FIG. 4, the insulation ring 208 is provided with a through hole 2080 configured to communicate with the annular cavity and the cover plate, that is, part of the cover plate can be directly exposed to the annular cavity. In this way, when the gas-producing medium 207 is injected into the annular cavity, the gas-producing medium 207 can be filled into the through hole 2080, and can directly come into contact with the cover plate, so that the cover plate serves as the first polar member.

To make the structure of the battery cover assembly more compact, the through hole 2080 extends from an inner end surface of the insulation ring 208 to the inner ring. In other variations, the through hole may also extend from the inner end surface of the insulation ring to the outer ring. Further, to ensure a sufficient contact area between the gas-producing medium and the cover plate to increase sensitivity, there are a plurality of through holes 2080 disposed at intervals along the circumferential direction of the insulation ring. In addition, to balance the stability of the connection and the sufficient contact area between the cover plate and the gas-producing medium, four through holes 2080 are disposed at equal intervals along the circumferential direction. In other embodiments, the number of the through hole may be another number, for example, three or more.

In this implementation, to establish a current flow path with the outside, as shown in FIG. 3, the outer end surface of the insulation ring 208 is further sealedly connected with a seal ring 210, the outer periphery of the flipping member 205 is sealedly connected to the seal ring 210, and the seal ring 210 is sealedly connected to the outer ring so as to be insulated from the battery post. That is, the flipping member 205 is connected to the insulation ring 208 through the seal ring, and the battery post and the outer periphery of the flipping member are respectively fixed on the inner ring and the outer ring located at two sides of the through hole 2080. In this way, the insulation reliability between the battery post and the outer periphery of the flipping member can be ensured, and when the seal ring 210 is made of a conducting material, the seal ring may establish a current loop between the flipping member and the outside, that is, form the electrode outer terminal. In addition, that the seal ring 210 is sealedly connected to the insulation ring 208 may seal the outer periphery of the flipping member, so that the internal gas pressure of the sealed chamber can act on the flipping member without leaking.

Further, to achieve stable sealing assembly of the flipping member and protection of the current interrupt structure, the flipping member 205 is further covered by a cover member 213, and the cover member is electrically connected to the flipping member to form the electrode outer terminal. In this way, the cover member may be used the electrode outer terminal, that is, a terminal boss may be disposed to establish a current loop with the outside through a connection member such as an electrode lead-out plate. For example, neighboring battery cells or neighboring battery modules may be connected through the electrode lead-out plate.

In addition, an outer periphery of the cover member may be sealedly connected to the seal ring 210. To achieve pressure relief described above, and ensure the safety of using the battery, the cover member 213 is provided with a vent hole 214 communicating with the outside. Moreover, the vent hole in the cover member may further enable the current interrupt structure to have a pressure difference with the atmospheric air directly, so that an action of the flipping member is achieved.

To achieve stable connection between the seal ring and the flipping member, the cover member 213 is formed as a covering cap structure, the outer end surface of the seal ring 210 is provided with an L-shaped rabbet, and the inner end surface the seal ring 210 is configured to connect to the insulation ring 208. The outer periphery of the flipping member 205 is embedded in and supports the L-shaped rabbet. In addition, the outer periphery is sealedly connected to the L-shaped rabbet by using the covering cap 210 covering the flipping member 205. Therefore, when the flipping member 205 is stably sealed and assembled, the current interrupt structure can be protected.

As described above, the medium injection hole 209 is formed on the conductive member 206, and therefore may be assembled in the following manner: First, the cover plate, the battery post and the seal ring 210 are sequentially fixed to the insulation ring 208 through, for example, ceramic brazing. That is, the four may be first constructed into an independent assembly. Then the conductive member 206 may be fixed to the battery post by laser welding, the flipping member may be connected to the conductive member by welding manner such as laser penetration welding or the foregoing boss welding structure, and the flipping member may be connected to the seal ring by laser welding. The gas-producing medium may be injected into the sealed chamber through the medium injection hole 209. After the injection is completed, the medium injection hole 209 may be sealed by welding or by using a sealing plug. Finally, the covering cap structure is connected to the flipping member by laser welding, thereby completing assembly and work of the entire battery cover assembly.

The battery cover assembly provided in the second implementation of the present disclosure is described. A battery cover assembly provided in the third implementation of the present disclosure will be described below with reference to FIG. 7 to FIG. 10.

As shown in FIG. 7 to FIG. 10, the battery cover assembly 300 has a sealed chamber 303 configured to fill a gas-producing medium 308, the sealed chamber 303 is constructed to enable the gas-producing medium 308 to be electrically connected to positive and negative electrodes of a battery, and when a voltage difference between the positive and negative electrodes of the battery exceeds a rated value, the gas-producing medium 308 is capable of producing gas, so that under the action of the pressure of the gas, the electrical connection between an electrode inner terminal and an electrode outer terminal is broken. The inner end surface of the cover plate is further sealedly connected with an inner insulation ring 311 to the electrode inner terminal, and the outer end surface of the cover plate is further sealedly connected with an outer insulation ring 312 to the electrode outer terminal, so that the sealed chamber 303 forms an annular cavity surrounding an axis of the electrode inner terminal. That is, when the electrode inner terminal and the electrode outer terminal are respectively insulated from the cover plate, the sealed chamber 303 in the present disclosure is enclosed.

In this implementation, similar to the second implementation, the battery cover assembly includes a first polar member 301 and a second polar member 302 respectively in contact with the gas-producing medium, one of the first polar member 301 and the second polar member 302 is configured to be connected to the positive electrode of the battery and the other is configured to be connected to the negative electrode of the battery, the first polar member 301 is formed by the electrode inner terminal, and the second polar member 302 is formed by the cover plate. That is, the cover plate is electrified and comes into contact with the gas-producing medium. Optionally, the cover plate has an annular plate protruding radially from the inner insulation ring 311 and the outer insulation ring 312. In this way, the cover plate is enabled to come into contact with the gas-producing medium in the sealed chamber 303 over a larger area through the annular plate, thereby improving gas-producing sensitivity. Further, the annular plate may include an uneven portion to increase surface roughness as described in the following implementations, thereby further improving the gas-producing sensitivity. A specific uneven portion is described in detail in the following implementations.

Specifically, the battery post as the electrode inner terminal extends along a medial-lateral direction, the cover plate is provided with a through hole through which the battery post passes, and the inner insulation ring 311 and the outer insulation ring 312 are disposed surrounding the through hole. In addition, the inner ring surface of the inner insulation ring 311 and the inner ring surface of the outer insulation ring 312 may be designed to be aligned in the axial direction, so that a larger contact area may exist between the annular plate of the cover plate and the gas-producing medium.

In this implementation, similar to the first implementation and the second implementation, the current interrupt structure further includes a flipping member 305 configured to serve as a part of a chamber wall of the sealed chamber 303, the electrode inner terminal and the electrode outer terminal are electrically connected to each other through the flipping member 305, and under the action of the pressure of the gas, the flipping member acts to disrupt the electrical connection between the electrode inner terminal and the electrode outer terminal. A conductive member 306 is fixed on an outer end surface of the electrode inner terminal, the flipping member 305 is electrically connected to the conductive member 306, the conductive member 306 is provided with a notch 315 which can be broken under the action of the pressure of the gas, and the notch 315 is disposed surrounding a connection point configured to connect to the flipping member 305. One of the flipping member 305 and the conductive member 306 is provided with a boss 316 and the other one is provided with a connection hole 317 configured to accommodate the boss 316, and the boss 316 is connected to the connection hole 317 through an annular welding point. Therefore, the pressure from the sealed chamber can be sensed in time, and the electrical connection between the electrode inner terminal and the electrode outer terminal can be disrupted in time.

Figure 7:
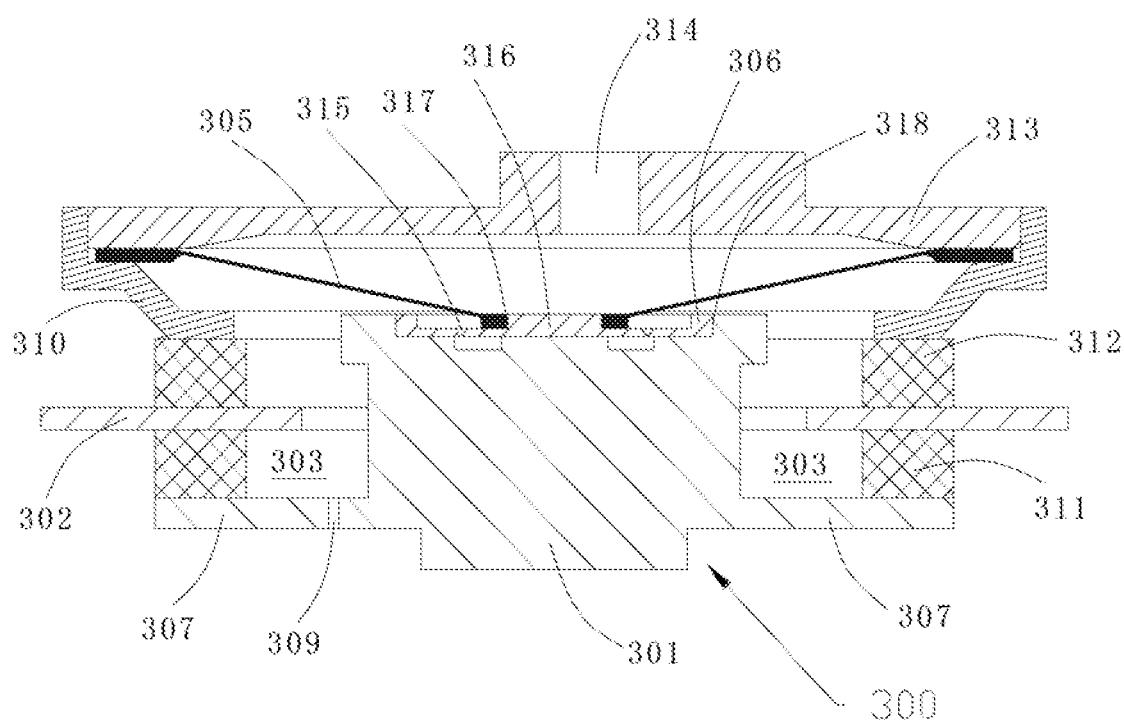
FIG. 7 is a schematic cross-sectional view of a current interrupt structure according to a third implementation of the present disclosure, where a voltage difference between a first polar member and a second polar member does not exceed a rated value.
Figure 8:
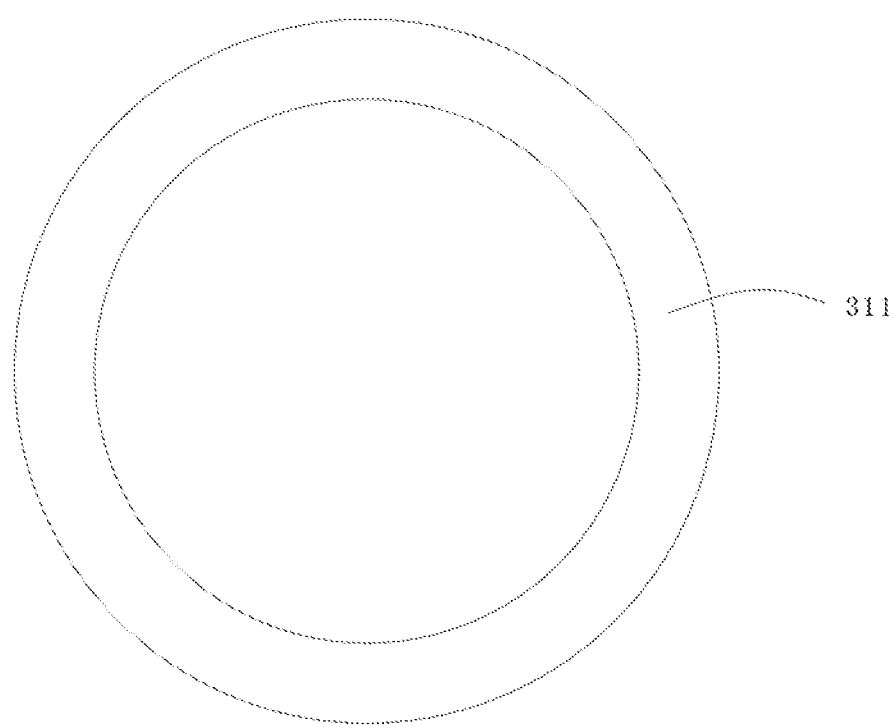
FIG. 8 is a schematic structural top view of an inner insulation ring according to the third implementation of the present disclosure.
Figure 9:
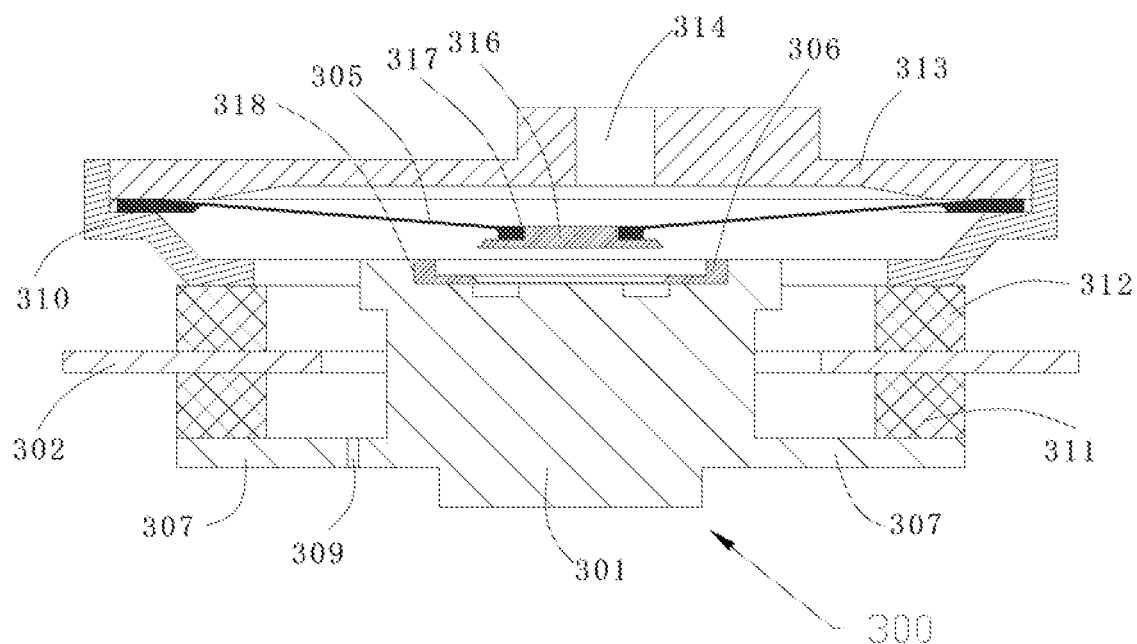
FIG. 9 is a schematic cross-sectional view of a current interrupt structure according to the third implementation of the present disclosure, where a voltage difference between a first polar member and a second polar member exceeds a rated value.

In the third implementation of the present disclosure, similar to the first and the second implementation, the flipping member 305 is disposed coaxially with the battery post and radially extends outward from the battery post, the side surface of the battery post is sealed and insulated to the inner insulation ring 311, the outer periphery of the flipping member 305 is fixed between the electrode outer terminal and the outer insulation ring 312, and sealedly connected to the outer insulation ring 312 so as to be insulated from the cover plate and form the annular cavity. That is, the first polar member (the battery post) 301, the second polar member 302, the flipping member 305 and the conductive member 306 are configured to enclose the sealed chamber 303. As shown in FIG. 7, specifically, the side surface of the battery post is connected in a sealed and insulating manner to an outer periphery of the flipping member 305, so that the sealed chamber 303 is formed as an annular cavity disposed around an axis of the battery post. In this way, an existing battery structure can be reasonably and fully used, so as to interrupt the current in time at the early stage of overcharging of the battery while making as few improvements to applied to the existing battery structure as possible.

Figure 5:
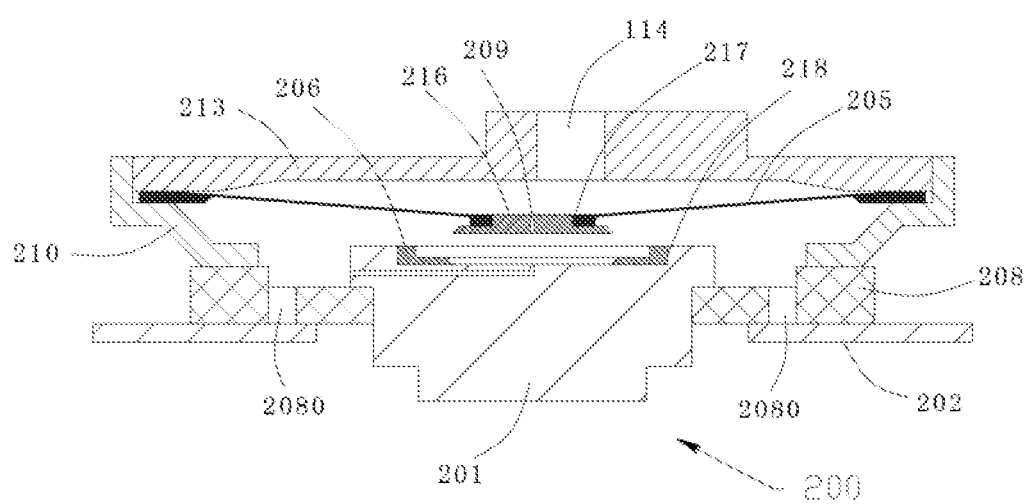
FIG. 5 is a schematic cross-sectional view of a current interrupt structure according to the second implementation of the present disclosure provides, where a voltage difference between a first polar member and a second polar member exceeds a rated value.
Figure 10:
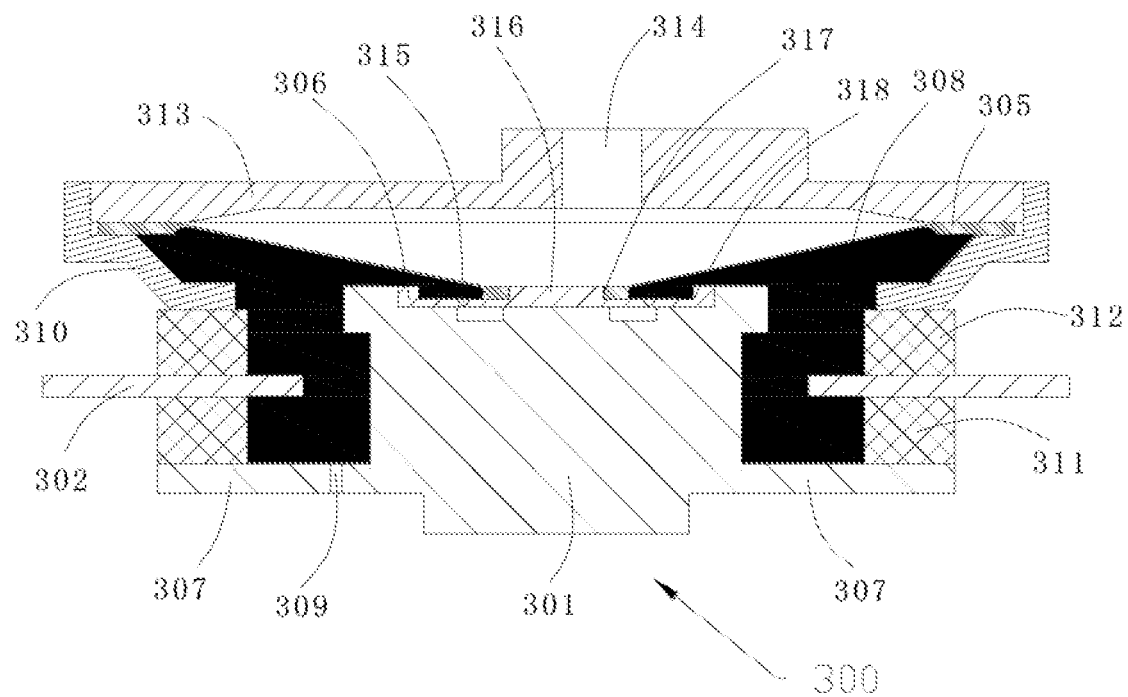
FIG. 10 is a schematic cross-sectional view of a current interrupt structure according to the third implementation of the present disclosure, where a sealed chamber is filled with a gas-producing medium.

As shown in FIG. 3 and FIG. 5, similar to the cover plate in the second implementation, in the third implementation of the present disclosure, the cover plate may further be an electrode applied to the gas-producing medium, that is, the cover plate is electrified. Specifically, as shown in FIG. 7 and FIG. 10, the current interrupt structure is fixed on the cover plate of the battery. As the second polar member 302, the cover plate is respectively connected in a sealed and insulating manner to the battery post and the outer periphery of the flipping member 305. In this way, because the cover plate can achieve the packaging function of the battery housing and may be used as an electrode which comes into contact with the gas-producing medium, thereby reducing the number of components in the battery cover assembly, and reducing the battery assembly time.

Further, to achieve the insulation of the battery post from the cover plate when being stably connected to the cover plate, specifically, as shown in FIG. 7, an inner end portion of the battery post includes a radial flange 307, an outer end surface of the radial flange 307 is sealedly connected with an inner insulation ring 311, and the cover plate is sealedly connected to an outer end surface of the inner insulation ring 311 so as to be insulated from the battery post. That is, in FIG. 7, the inner insulation ring 311 is located at the inner side of the cover plate. In addition, the manufacturing material of the insulation ring 311 herein and the outer insulation ring 312 in the following and the process of fixedly connecting the two to a neighboring component are the same as the insulation ring in the first implementation. Details are not described herein again.

To facilitate the injection of the gas-producing medium 308 into the annular cavity, as shown in FIG. 7, a medium injection hole 309 is formed on the radial flange 307, so that the gas-producing medium may be injected into the enclosed annular cavity from the inner end of battery post.

In this implementation, to achieve the operation of the current interrupt structure, as shown in FIG. 7, because the outer periphery of the flipping member 305 is sealedly connected with the outer insulation ring 312, the cover plate is sealedly connected to the inner end surface of the outer insulation ring 312 to be insulated from the outer periphery of the flipping member 305. In this way, the insulation of the outer periphery of the flipping member 305 from the cover plate with an opposite polarity is achieved and a short circuit of the battery is prevented. Moreover, the flipping member 305 can sense the function of pressure, so that the outer periphery thereof may be used as a supporting point to flip and break the electrical connection to the conductive member 306, and input and output of the battery current are interrupted in time.

To further improve gas-producing sensitivity of the gas-producing medium, in an exemplified implementation in the present disclosure, a third technical solution is adopted. That is, as shown in FIG. 7 and FIG. 10, the inner ring surface of the inner insulation ring 311 and the inner ring surface of the outer insulation ring 312 are aligned in the axial direction, so that the cover plate has the annular plate protruding radially from the inner insulation ring 311 and the outer insulation ring 312. In this way, the hole wall of the through hole of the cover plate and two end surfaces of the annular plate can come into contact with the gas-producing medium, thereby improving the gas-producing sensitivity of the gas-producing medium 308.

In this implementation, as shown in FIG. 7, the outer end surface of the outer insulation ring 312 is further sealedly connected with a seal ring 310, the outer periphery of the flipping member 305 is sealedly connected to the seal ring 310, that is, the flipping member 305 is connected to the outer insulation ring 312 through the seal ring 310. In this way, when the seal ring is a conducting material, the flipping member can construct the current loop with the outside, that is, form an electrode outer terminal. In addition, that the seal ring 310 is sealedly connected to the outer insulation ring 312 can seal the outer periphery of the flipping member, so that the internal pressure of the sealed chamber can act on the flipping member without leaking.

Further, to achieve stable sealing assembly of the flipping member and protection of the current interrupt structure, the flipping member 305 is further covered by a cover member 313. The cover member 313 is electrically connected to the flipping member 305 to form the electrode outer terminal. In this way, a current loop is established with the outside through the electrode lead-out plate. For example, neighboring battery cells or neighboring battery modules may be connected through the electrode lead-out plate.

In addition, the outer periphery of the cover member is sealed with the flipping member, ensuring sealing of the sealed chamber. To achieve the leakage of the gas, the cover member 313 is provided with a vent hole 314 communicating with the outside. In this way, the gas in the sealed chamber can leak when the electrical connection between the flipping member and the conductive member is broken, to prevent battery explosion. Moreover, the vent hole in the cover member may further enable the current interrupt structure to have a pressure difference with the atmospheric air directly, so that an action of the flipping member is achieved.

To achieve stable connection between the seal ring and the flipping member, the cover member 313 is formed as the covering cap structure, the outer end surface of the seal ring 310 is provided with an L-shaped rabbet, and the inner end surface of the seal ring 310 is configured to connect to the outer insulation ring 312. The outer periphery of the flipping member 305 is embedded in and supports the L-shaped rabbet. In addition, the outer periphery is sealedly connected to the L-shaped rabbet by using the covering cap structure covering the flipping member 305. Therefore, when the cover member 313 is sealedly assembled to the flipping member 305 stably, the current interrupt structure can be protected.

In addition, as shown in FIG. 7, an accommodating hole 318 is formed on the outer end surface of the battery post, and the outer periphery of the conductive member 306 is fixed on the inner wall of the accommodating hole 318. In this way, the conductive member 306 may be stably fixed through the annular periphery, and a region inside the notch 315 can be pulled apart under the action of an external force such as a tensile force of the flipping member 305 or the direct pressure of the gas because the region inside the notch 315 is not connected to the battery post.

As described above, the medium injection hole 309 is form on the radial flange 307 of the battery post, which may be assembled in the following manner: First, the upper end of the battery post is passed through the cover plate. The battery post and the inner insulation ring 311 are fixed to the cover plate by, for example, ceramic brazing. The seal ring and the outer insulation ring 312 are fixed to the cover plate by, for example, ceramic brazing. Then the conductive member 306 is fixed to the battery post by, for example, laser welding. The flipping member may be connected to conductive member by welding such as laser penetration welding or the boss welding structure. The flipping member may be connected to the seal ring by laser welding. The gas-producing medium may be injected into the sealed chamber through the medium injection hole 309. After the injection is completed, the medium injection hole 309 may be sealed by welding or by using a sealing plug. Finally, the cover plate structure is connected to the flipping member by, for example, laser welding, thereby completing assembly and work of the entire battery cover assembly.

The battery cover assembly provided in the third implementation of the present disclosure is described above. A battery cover assembly provided in the fourth implementation of the present disclosure will be described below with reference to FIG. 11 to FIG. 12.

Figure 11:
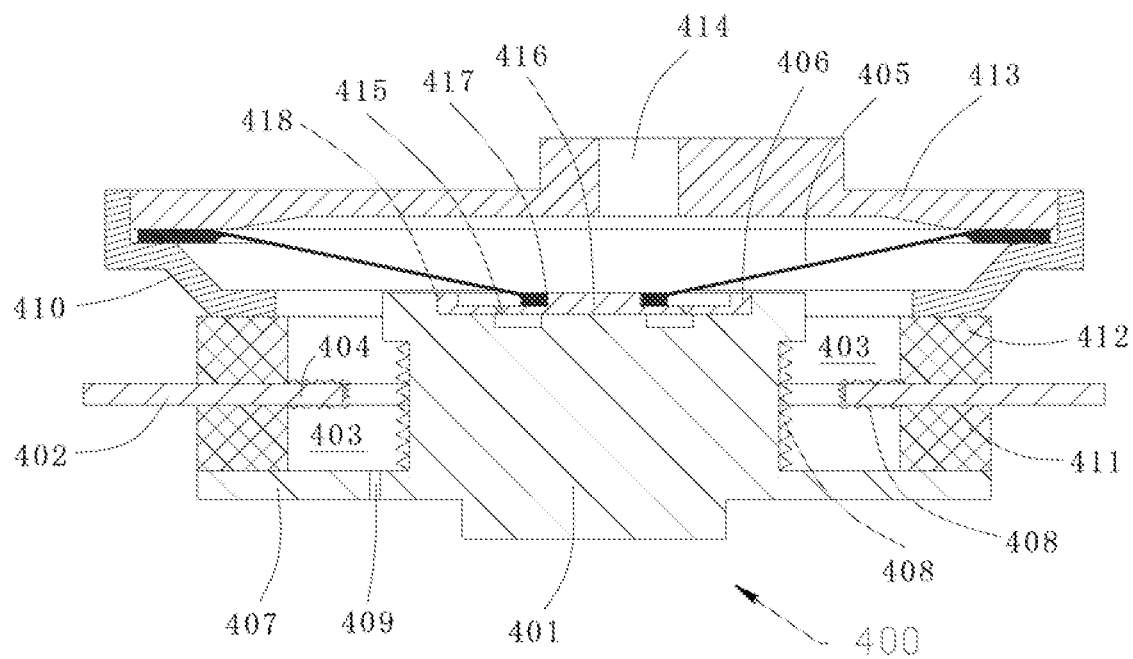
FIG. 11 is a schematic cross-sectional view of a current interrupt structure according to a fourth implementation of the present disclosure, where a voltage difference between a first polar member and a second polar member does not exceed a rated value.
Figure 12:
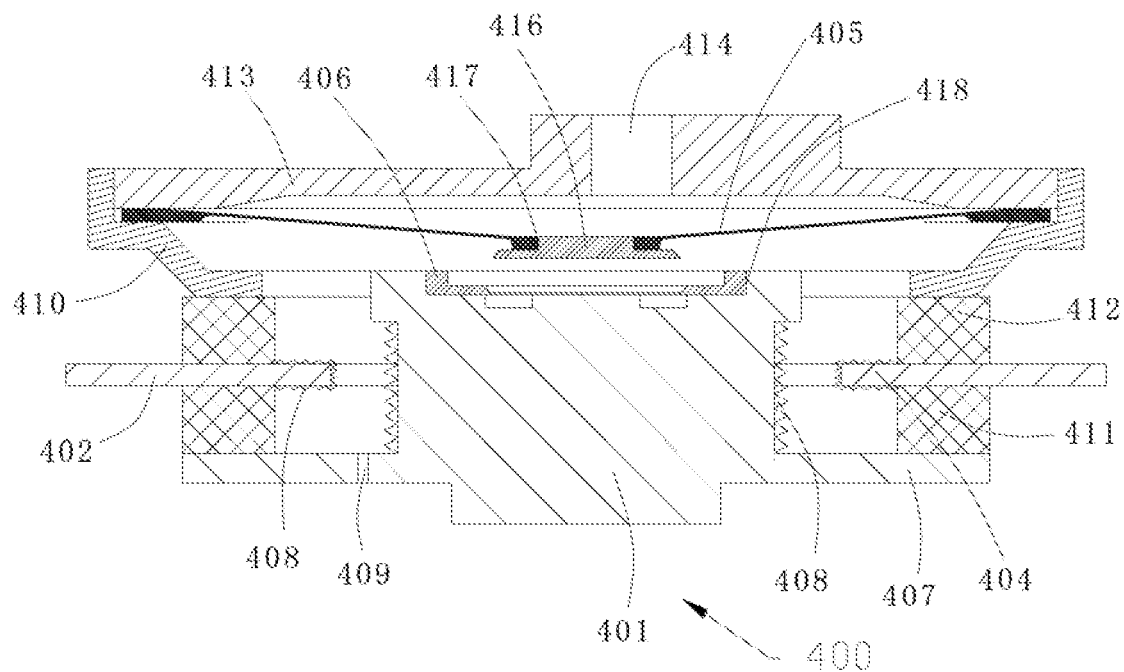
FIG. 12 is a schematic cross-sectional view of a current interrupt structure according to the fourth implementation of the present disclosure, where a voltage difference between a first polar member and a second polar member exceeds a rated value.

As shown in FIG. 11 and FIG. 12, the battery cover assembly 400 includes a sealed chamber 403 configured to fill a gas-producing medium. The sealed chamber 403 is constructed to cause the gas-producing medium to be electrically connected to positive and negative electrodes of a battery, and when a voltage difference between the positive and negative electrodes of the battery exceeds a rated value, the gas-producing medium is capable of producing gas, to disrupt the electrical connection between the electrode inner terminal and the electrode outer terminal under a pressure of the gas. An inner chamber wall of the sealed member 403 is provided with an uneven portion 408 to increase surface roughness. In this way, by increasing roughness inside the sealed chamber through the uneven portion 408, a contact area between the gas-producing medium and the electrodes may be effectively expanded, and gas-producing sensitivity is improved.

Specifically, in the fourth implementation of the present disclosure, the uneven portion 408 may be implemented in various manners. For example, the uneven portion 408 may be formed in a tooth-shaped continuous structure and/or microporous structures distributed at intervals. A specific shape of the tooth-shaped continuous structure may be formed as at least one of a semicircular structure or a rectangular structure through machining, and is arranged in a tooth-shaped structure. Alternatively, micropores may be formed on the uneven portion 408 through chemical corrosion. For example, a corrosive chemical solvent may be sprayed on an inner wall of the sealed chamber 403, for example, on surfaces, which are to be exposed to the sealed chamber, of the first polar member and the second polar member, and the chemical solvent undergoes chemical reactions respectively with the first polar member and the second polar member, to form microporous structures on surfaces of components such as the first polar member 401 and the second polar member 402. The implementation of the uneven portion is not limited in the present disclosure.

In addition, the uneven portion 408 may merely be formed on a surface that is of the first polar member 401 and that is exposed on the sealed chamber 403, may also be merely formed on a surface that is of the second polar member 402 and that is exposed on the sealed chamber 403. To improve gas-producing sensitivity, preferably, the uneven portion 408 is formed on both of the surface that is of the first polar member 401 and that is exposed on the sealed chamber 403 and the surface that is of the second polar member 402 and that is exposed on the sealed chamber 403.

Similar to at least part of the first implementation, the second implementation and the third implementation, in a fourth implementation, the battery cover assembly respectively includes a first polar member 401 and a second polar member 402 that are in respective contact with the gas-producing medium and construct at least part of a chamber wall of a sealed chamber 4023. One of the first polar member 401 and the second polar member 402 is configured to be connected to the positive electrode of the battery and the other is configured to be connected to the negative electrode of the battery, and an uneven portion 408 is formed on a surface of the first polar member 401 and/or a surface of the second polar member 402.

Optionally, the electrode inner terminal is formed by a battery post extending along a medial-lateral direction, the battery post serves as the first polar member 401 and is connected in a sealed and insulating manner to the cover plate. In addition, the current interrupt structure further includes a flipping member 405 of the sealed chamber 403. The battery post and the electrode outer terminal are electrically connected to each other through the flipping member, and the flipping member interrupts the electrical connection between the battery post and the electrode outer terminal under a pressure of the gas. Further, the flipping member 405 is disposed coaxially with the battery post and radially extends outward from the battery post, and an outer periphery of the flipping member 305 is connected in a sealed and insulating manner to a side of the battery post, so that the sealed chamber 303 is formed as an annular cavity disposed around an axis of the battery post.

Optionally, a conductive member 406 is fixed on an outer end surface of the battery post, the flipping member 405 is electrically connected to the conductive member 406, the conductive member 406 is provided with a notch 415 which can be broken under the pressure of the gas, and the notch 415 is disposed surrounding a connection point configured to connect to the flipping member 105. One of the flipping member 405 and the conductive member 406 is provided with a boss 416 and the other one is provided with a connection hole 417 configured to accommodate the boss 416, and the boss 416 is connected to the connection hole 417 through an annular welding point. The second polar member 402 is formed by the cover plate, and an outer periphery of the flipping member 405 is connected in a sealed and insulating manner to the cover plate.

In addition, an inner end portion of the battery post includes a radial flange 407, an outer end surface of the radial flange 407 is sealedly connected with an inner insulation ring 411, and the cover plate is sealedly connected to the inner insulation ring 411 so as to be insulated from the battery post. Further, the side of the battery post includes a cylindrical surface perpendicular to the radial flange 407, and the cylindrical is covered by the uneven portion 408.

The radial flange 407 is provided with a medium injection hole 409 configured to communicate with the annular cavity so as to inject the gas-producing medium from an inner end of the battery post to the annular cavity. In addition, the outer periphery of the flipping member 405 is further sealedly connected with an outer insulation ring 412, and the cover plate is sealedly connected to the outer insulation ring 412, so as to be insulated from the outer periphery of the flipping member 405. The cover plate is provided with a through hole for the battery post to pass therethrough, and the inner insulation ring 411 and/or the outer insulation ring 412 are disposed surrounding the through hole. Further, an inner ring surface of the inner insulation ring 411 and an inner ring surface of the outer insulation ring 412 are aligned along an axial, so that the cover plate includes an annular plate 404 radially protruding from the inner insulation ring 411 and the outer insulation ring 412, and a surface that is of the annular plate 404 and that is exposed on the annular cavity is covered by the uneven portion 408.

An outer end surface of the outer insulation ring 412 is sealedly connected with a seal ring 410, the outer periphery of the flipping member 405 is sealedly connected to the seal ring 410, the flipping member 405 is further covered by a cover member 413, and the cover member 413 is electrically connected to the flipping member 405 to form an electrode outer terminal. In addition, the cover member 413 is provided with a vent hole 414 communicating with the outside.

To achieve stable connection between the seal ring and the flipping member, the cover member 413 is formed as a covering cap structure, an outer end surface of the seal ring 410 is provided with an L-shaped rabbet, and an inner end surface of the seal ring 410 is configured to be connected to the outer insulation ring 412. The outer periphery of the flipping member 405 is embedded in and supports the L-shaped rabbet. In addition, the outer periphery is sealedly connected to the L-shaped rabbet by using a covering cap structure of the flipping member 413. In this way, the cover member 413 can achieve stable seal assembly of the flipping member 405 and protection of the current interrupt structure at the same time.

In addition, to ensure that the conductive member 406 is fixed with the battery post, the notch 415 on the conductive member 406 can also be pulled apart, as shown in FIG. 11 and FIG. 12, an outer end surface of the battery post is provided with an accommodation hole 417, an outer periphery of the conductive member 406 is fixed on an inner wall of the accommodation hole 417. In this way, the conductive member 406 may be stably fixed by using the annular periphery, while a region inside the notch 415 can be pulled apart under the action of an external force such as a tensile force of the flipping member 405 or a direct pressure of the gas because the region inside the notch 415 is not connected to the battery post.

The structure and assembly method of the battery cover assembly in this implementation is similar to effects and deformation manners of same parts of the first implementation, the second implementation and the third implementation, and is not described in detail again.

The battery cover assembly provided by the fourth implementation of the present disclosure is described above. Without departing from the concept of the present disclosure, features in the fourth implementation, for example, the uneven portion, can be applied to all the other implementations. Battery cover assemblies 500 provided by two embodiments of the fifth implementation of the present disclosure will be described below with reference to FIG. 13 and FIG. 14. In addition, for simplicity of the description, only features of the fifth implementation that are different from the foregoing four implementations are described in detail, and effects and deformation manners of the same features are not described again.

Figure 13:
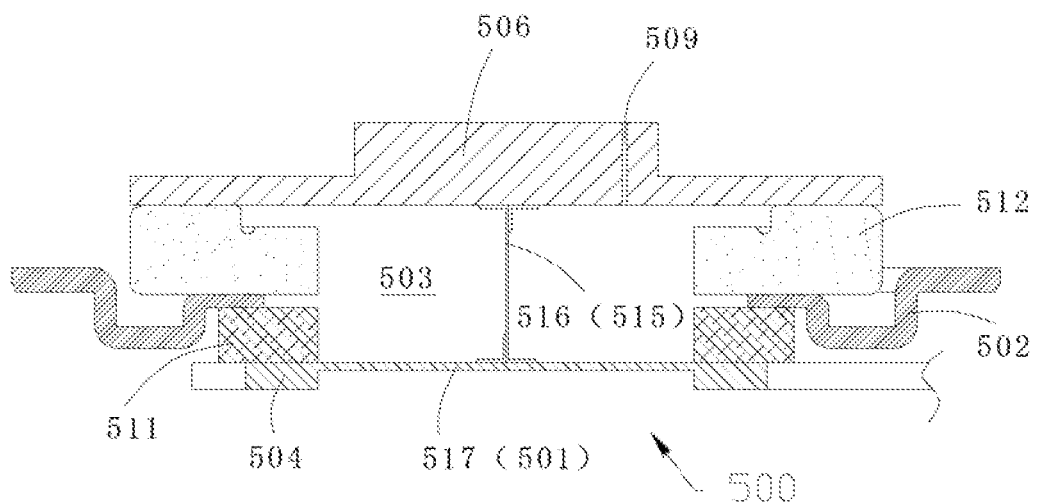
FIG. 13 is a schematic cross-sectional view of a first embodiment of a current interrupt structure according to the fifth implementation of the present disclosure.
Figure 14:
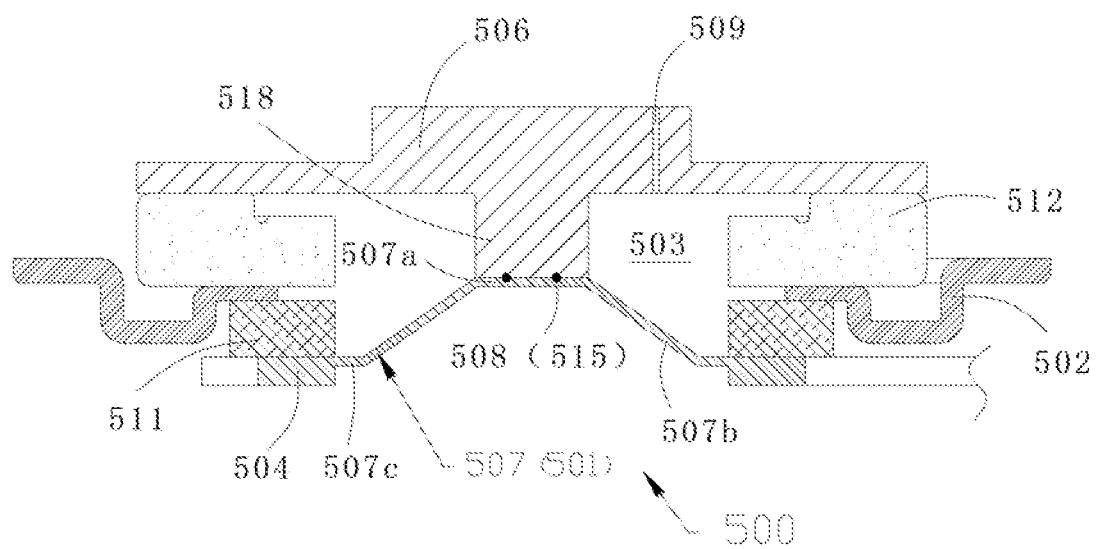
FIG. 14 is a schematic cross-sectional view of a second embodiment of a current interrupt structure according to the fifth implementation of the present disclosure.

As shown in FIG. 13 and FIG. 14, the battery cover assembly 500 includes a sealed chamber 503 configured to fill a gas-producing medium. The electrode inner terminal constructs a part of a chamber wall of the sealed chamber 503, the sealed chamber 503 is constructed to cause the gas-producing medium to be electrically connected to positive and negative electrodes of a battery, and when a voltage difference between the positive and negative electrodes of the battery exceeds a rated value, the gas-producing medium is capable of producing gas, so that the electrode inner terminal acts to disrupt the electrical connection between the electrode inner terminal and the electrode outer terminal under a pressure of the gas.

That is, in the fifth implementation, which is different from a manner of using the flipping member to disrupt the electrode inner terminal and the electrode outer terminal in the foregoing four implementations, the two embodiments of the fifth implementation both use the electrode inner terminal to act to disrupt the electrical connection with the electrode outer terminal. Optionally, in the two embodiments, the electrode outer terminals 506 are designed to construct parts of the chamber walls of the sealed chambers, and to form a medium injection hole 509 to communicate with the outside and the sealed chamber. Both of the electrode outer terminal and the electrode inner terminal serve as the chamber walls of the sealed chamber 503. An existence of the medium injection hole 509 resolves a problem that the gas-producing medium is injected from the outer terminal.

The two embodiments are the same in the following aspects: the battery cover assembly includes a first polar member 501 and a second polar member 502 respectively in contact with the gas-producing medium, one of the first polar member 501 and the second polar member 502 is configured to connect to the positive electrode of the battery, and the other is configured to connect to the negative electrode of the battery. The first polar member 501 is formed by the electrode inner terminal, the electrode inner terminal and the electrode outer terminal is electrically connected to each other through a conductive structure, a periphery of the electrode inner terminal is connected in a sealed and insulating manner to a periphery of the electrode outer terminal 506, so that the sealed chamber 503 forms an annular cavity disposed surrounding the conductive structure. In this way, when the gas-producing medium in the annular cavity accumulates and the pressure of the gas increases, the electrode inner terminal can act to disrupt the electrical connection between the electrode inner terminal and the electrode outer terminal by pulling apart the conductive structure.

For convenience of pulling apart the electrode inner terminal, the electrode inner terminal is formed as a sheet structure, and includes a terminal outer ring 504 connected to the electrode outer terminal in a sealed and insulating manner, and a terminal inner ring 517 serving as a part of the chamber wall of the sealed chamber 503. The terminal outer ring 504 is configured to be electrically connected to a cell through a connection member such as a lead piece, the conductive structure is disposed between the terminal inner ring 517 and the electrode outer terminal, and can be deformed under the pressure of the gas to be pulled apart. Because the sheet structure is formed, under the pressure of the gas from the inside, the terminal inner ring 517 can be deformed to pull apart the conductive structure. To further ensure the deformation of the terminal inner ring, a thickness of the terminal inner ring is smaller than a thickness of the terminal outer ring. On one aspect, connection strength between the terminal outer ring and other elements are facilitated. On another aspect, the terminal inner ring is ensured to be deformed and pulled apart, that is, after disrupting the electrical connection with the electrode inner terminal and the electrode outer terminal, the terminal inner ring can be pulled apart, so that the gas in the sealed chamber is leaked into the battery, for example, through an explosion-proof valve mounted on the cover plate, thereby preventing the battery from explosion.

That is, in this implementation, because of lack of the flipping member in the foregoing implementations, to ensure sealing of the sealed chamber, no vent hole can be formed on the electrode outer terminal. Therefore, the terminal inner ring may be designed to be pulled apart to leak the gas, and in this implementation, the battery cover assembly 500 further includes an explosion-proof valve mounted on the cover plate. The explosion-proof valve is a common component in this field, and is a component to prevent the battery from explosion caused by excessive large pressure of gas from the inside. The explosion-proof valve is provided with a set opening pressure, and when a pressure inside the battery is greater than the set opening pressure, the explosion-proof valve is opened to release the pressure, thereby ensuring the battery safety.

As shown in FIG. 13, in the first embodiment, the conductive structure includes a terminal conductive sheet 516 connected between the terminal inner ring and the electrode outer terminal 506, and a breaking strength of the terminal conductive sheet is less than a breaking strength of the terminal inner ring, the annular sealed chamber is disposed surrounding the terminal conductive sheet. Because the breaking strength of the terminal conductive sheet is less than the breaking strength of the terminal inner ring, the terminal conductive sheet can first drive, under the pressure of the gas from the inside, the terminal inner ring to deform, and then pull apart the terminal conductive sheet, so as to disrupt the electrical connection between the electrode inner terminal and the electrode outer terminal. As the pressure continues to increase, the terminal inner ring is pulled apart, sp that the gas of the sealed chamber leaks to ensure safety.

As shown in FIG. 13, the terminal conductive sheet may be formed as a Z-shape sheet, and a first section and a second section of the Z-shape sheet that are parallel to each other are respectively welded to the electrode inner terminal and the electrode outer terminal. In addition, an L-shaped sheet may be added, and the L-shaped sheet forms a T-shape structure respectively with the first section and the second section of the Z-shape sheet to strengthen welding strength and to prevent an end portion of the terminal conductive sheet from being disconnected by mistake to result in failure of the battery.

As shown in FIG. 14, in the second embodiment of this implementation, the electrode outer terminal 506 forms a covering cap structure, and the inner end surface of the electrode outer terminal 506 includes a terminal boss 518 extending into the sealed chamber, an inner end surface of the terminal boss 518 is fixed to the terminal inner ring through a welding point 508 formed as the conductive structure. That is, the conductive structure in this embodiment is only the welding point 508. In this way, under the pressure of the gas, the welding point 508 is pulled apart to disrupt the electrical connection between the electrode inner terminal and the electrode outer terminal.

Specifically, as shown in FIG. 14, the electrode outer terminal 506 is formed as the covering cap structure, the inner end surface of the cover plate structure includes the terminal boss 518 extending into the sealed chamber, the inner end surface of the terminal boss 518 is fixed to the terminal inner ring through a welding point 508 formed as the conductive structure. In this way, when the battery is at the early stage of overcharging, under a pressure of a gas produced by dissociation of the gas-producing medium, the welding point 518 between the terminal inner ring and the terminal boss 518 is pulled apart, thereby interrupting the current transfer in the battery. In addition, the pressure of the gas inside the sealed chamber 503 continues to increase until the terminal inner ring is pulled apart. The sealed chamber opens, and the gas enters inside the battery, and, for example, leaks through the explosion-proof valve, thereby preventing the battery from explosion. Further, what is different from the fifth implementation is that, in this implementation, there is no need to dispose an additional terminal conductive member 516, thereby reducing the number of components and parts, and reducing the assembly time of the current interrupt structure.

The terminal boss 518 may be welded to the conductive member 506, to reduce the assembly time and prevent the connection between the electrode outer terminal and the terminal boss from being disrupted under the pressure of the gas. The terminal boss 518 may be formed integrally on the conductive member 506. Specifically, to take full advantage of a current structure of the components and parts, the electrode outer terminal 506 includes the covering cap structure and the terminal boss 518 integrally formed on the inner end surface of the covering cap structure.

Further, to facilitate the connection between the terminal inner ring and the terminal boss 518, as shown in FIG. 14, the terminal inner ring is formed as a bowl structure 507 protruding facing the terminal boss 518. Specifically, an outer end surface of a bowl bottom of the bowl structure 507 is adjacent to the inner end surface of the terminal boss 518 through the welding point 508. More specifically, the outer end surface of the bowl bottom forms a flat wall 507*a* of the bowl bottom, and the bowl structure further includes a taper ring structure 507*b* extending from a periphery of the flat wall 507*a* of the bowl bottom to the inside, and a radial flange 507*c* formed on the inner end surface of the taper ring structure 507*b*, and the radial flange is connected with the terminal outer ring. Inflection point parts of the bowl structure may all serve as snap points of the terminal inner ring. The inflection point parts may be weakened, for example, by processing the notch.

Further, as shown in FIG. 14, the welding point 508 is formed as an annular structure, and the annular structure is located in an inner side of the periphery of the flat wall 507*a* of the bowl bottom. Because it is easier for a larger periphery of the annular structure to ensure welding stability of the terminal boss and the terminal inner ring and prevent an instantaneous high current from fusing the welded structure. On another aspect, when the annular structure increases, under the pressure of the gas, it is less easy for the annular structure to be pulled apart, influencing sensitivity of the current interrupt structure. Based on this, by disposing the annular structure on the inner side of the flat wall 507*a* of the bowl bottom, that is, an outer periphery of the flat wall 507*a* of the bowl bottom surrounds the annular structure, so that both of the sensitivity and welding stability of the current interrupt structure are ensured.

In the fifth implementation of the present disclosure, the cover plate serves as the second polar member 502, that is, the cover plate is electrified to serve as an electrode applied to the gas-producing medium. Specifically, as shown in FIG. 13 and FIG. 14, the cover plate is also connected between a periphery of the electrode inner terminal and a periphery of the electrode outer terminal 506 in a sealed and insulating manner. In this way, because the cover plate can achieve the packaging function of the battery housing and serve as an electrode that can be in contact with the gas-producing medium, the number of components and parts of the current interrupt structure is reduced, and the assembly time of the battery is reduced.

Specifically, to achieve sealed and insulating connection between the cover plate and the electrode inner and outer terminals at the same time, as shown in FIG. 14, an inner insulation ring 511 is sealedly connected between the electrode inner terminal and the cover plate, an outer insulation ring 512 is sealedly connected between the electrode outer terminal and the cover plate, and the inner insulation ring 511 and the outer insulation ring 512 are spaced, so that the cover plate is exposed on the sealed chamber to serve as the second polar member.

The battery cover assembly 500 according to the fifth implementation of the present disclosure is described above. A battery cover assembly 600 provided by the sixth implementation of the present disclosure is described below with reference to FIG. 15 to FIG. 20.

As shown in FIG. 15 to FIG. 20, the battery cover assembly 600 includes a cover plate, an electrode inner terminal and an electrode outer terminal. The electrode inner terminal is electrically connected to the electrode outer terminal through a current interrupt structure mounted on the cover plate. The battery cover assembly further includes a sealed chamber 603 configured to fill a gas-producing medium 604 and mounted on the outer side of the cover plate 612. The sealed chamber 603 is constructed to cause the gas-producing medium to be electrically connected to positive and negative electrodes of a battery, and when a voltage difference between the positive and negative electrodes of the battery exceeds a rated value, the gas-producing medium 604 is capable of producing gas, to break through the sealed chamber 603 under the action of the pressure of the gas, allowing the gas to enter the inside of the battery and flow to the current interrupt structure, to disrupt the electrical connection between the electrode inner terminal and the electrode outer terminal under the action of the pressure of the gas. Much different from other various implementations in the present disclosure, the sealed chamber 603 is formed on the outside of the battery. In this way, because the sealed chamber 603 is not disposed inside the battery and does not occupy space in the battery, so that sufficient space can be provided for disposing components such as the cell inside the battery, thereby increasing the energy density of the battery. In addition, because the sealed chamber 603 is disposed outside the battery, the gas-producing medium is easier to be injected into the enclosed sealed chamber 603 from the outside of the battery. In addition, different from the foregoing five implementations, in the sixth implementation and the following seventh implementation, the current interrupt structure and the cavity surrounding the sealed chamber 603 are two independent structures, and the current interrupt structure may use the current interrupt device in the prior art.

The battery cover assembly includes a first polar member 601 and a second polar member 602 respectively in contact with the gas-producing medium. One of the first polar member 601 and the second polar member 602 is configured to be electrically connected to the positive electrode of the battery, and the other is configured to be electrically connected to the negative electrode of the battery. Different from other various implementations of the present disclosure, the first polar member 601 is formed on the second polar member 602 in a sealed and insulating manner, so that the two jointly form a hood structure facing towards the inner opening of the battery. The opening on the hood structure is further sealedly connected with a pressure relief member 605 to define the sealed chamber, and the pressure relief member 605 can be cracked under the action of gas pressure, to allow the gas to flow to the inside of the battery. That is, the hood structure is configured to not only establish two electrodes with opposite polarities having voltage difference for the gas-producing medium, but also provide a sealed chamber having a larger space and capable of filling enough gas-producing medium, and increase contact areas between the gas-producing medium and the first polar member 601 and between the gas-producing medium and the second polar member 602, thereby improving gas-producing sensitivity.

Therefore, when the battery is in the early stage of overcharging, the gas-producing medium 604 decomposes to produce the gas under the action of the voltage difference between the first polar member 601 and the second polar member 602, and then the gas pressure in the sealed chamber 603 is increased. In this case, under the action of a certain gas pressure, the pressure relief member 605 relieves pressure, and the gas enters the inside of the battery and is connected to the current interrupt structure. The gas pressure inside the battery continues to rise until the electrical connection between the conductive member 615 and the flipping member 614 is disrupted, thereby interrupting the current transfer of the battery.

Figure 15:
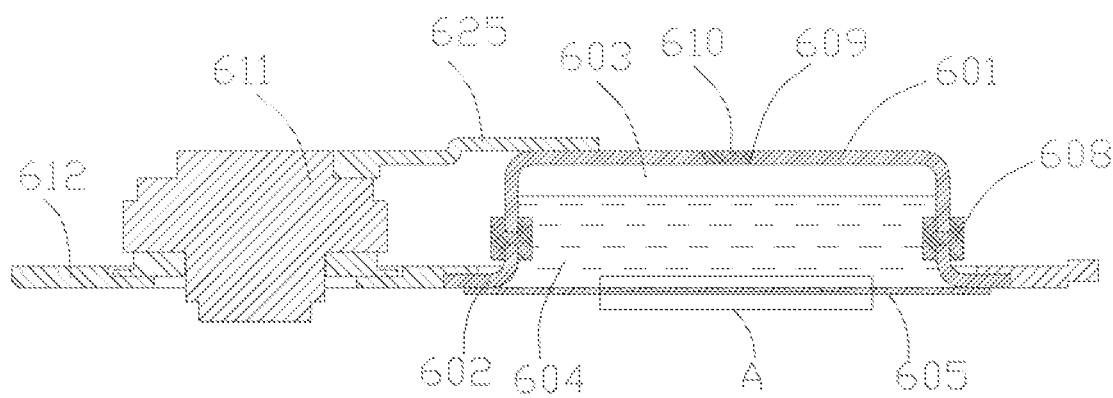
FIG. 15 is a partial cross-sectional view of a battery cell located in a position according to the sixth implementation of the present disclosure.

As shown in FIG. 15, the pressure relief member 605 may be implemented in various manners. For example, the pressure relief member 605 may be a sealing plate sealedly connected on the hood structure, or a pressure relief valve sealedly connected on a pressure relief plate. When the gas pressure produced by the gas is greater than or equal to the opening pressure of the pressure relief valve, the pressure relief valve is in an on state, and when the gas pressure produced by the gas is lower than the opening pressure of the pressure relief valve, the pressure relief valve closes.

Figure 16:
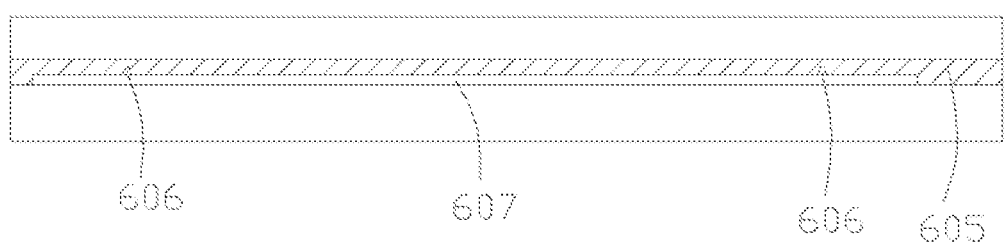
FIG. 16 is a partial enlarged diagram of a part A in FIG. 15.
Figure 20:
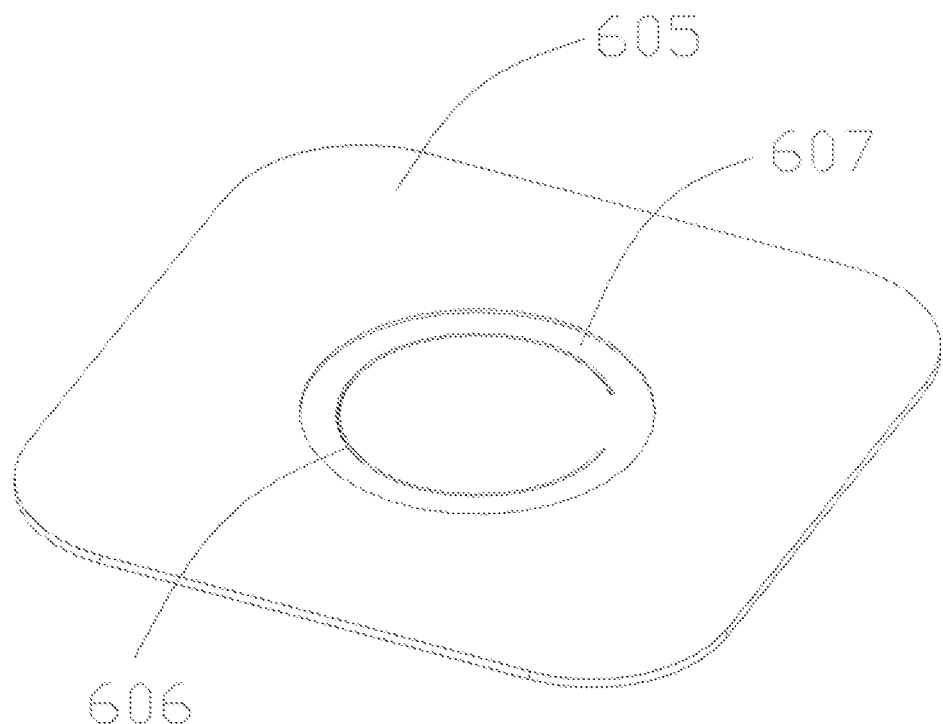
FIG. 20 is a three-dimensional schematic structural diagram of a pressure relief piece according to the sixth implementation of the present disclosure.

In another implementation of the pressure relief member 605, to improve the response sensitivity of the current interrupt structure, as shown in FIG. 16 and FIG. 20, the pressure relief member 605 is provided with a first notch 606. The first notch 606 is disconnected under the action of the gas pressure, so that the gas can be relieved via the pressure relief member 605. That is, by processing a corresponding part of the pressure relief member 605 to a weak part of a region with less strength than that in other regions, when the internal gas pressure in the sealed chamber 603 rises, the pressure can cause the first notch 606 to be pulled apart, thereby allowing the gas to flow to the inside of the battery through a torn gap on the pressure relief member, and as the gas pressure continues to increase, the current transfer is interrupted by using the current interrupt structure.

To further improve the sensitivity of the current interrupt structure, as shown in FIG. 16 and FIG. 20, the pressure relief member 605 is formed as a pressure relief plate having the first notch 606. The pressure relief plate is provided with a weakening groove 607, and the first notch 606 is located on a bottom wall of the weakening groove 607. In this way, by disposing the first notch 606 in the weakening groove 607, because structural strength of the weakening groove 607 is lower than that in other regions, the overall structural strength at the first notch 606 is further reduced, thereby improving the sensitivity of the current interrupt structure.

Still further, to simplify components in the current interrupt structure, and improve the sensitivity of the current interrupt structure, the pressure relief member 605 is a conductive member, thereby increasing a contact area between the gas-producing medium and electrode thereof, and improving the sensitivity of the current interrupt structure.

To prevent the pull-apart part of pressure relief member from falling into the inside of the battery after the first notch 606 is broken by the gas pressure, to cause a short circuit, as shown in FIG. 20, the first notch 606 is formed as a non-linear structure with two ends separated from each other. That is, the first notch 606 is formed as a non-closed structure. In this way, although the first notch 606 is pulled apart, the part surrounded by the first notch 606 is still attached to the pressure relief member 605, thus preventing the occurrence of a short circuit inside the battery due to the falling of the broken pieces, and improving the battery safety.

The non-linear structure may be form as a curved structure. Preferably, to improve the sensitivity of the current interrupt structure and the battery safety, the non-linear structure is formed as a major arc structure. In another variant, the first notch 606 may be formed as a Y-shaped structure or a zigzag line structure.

Figure 18:
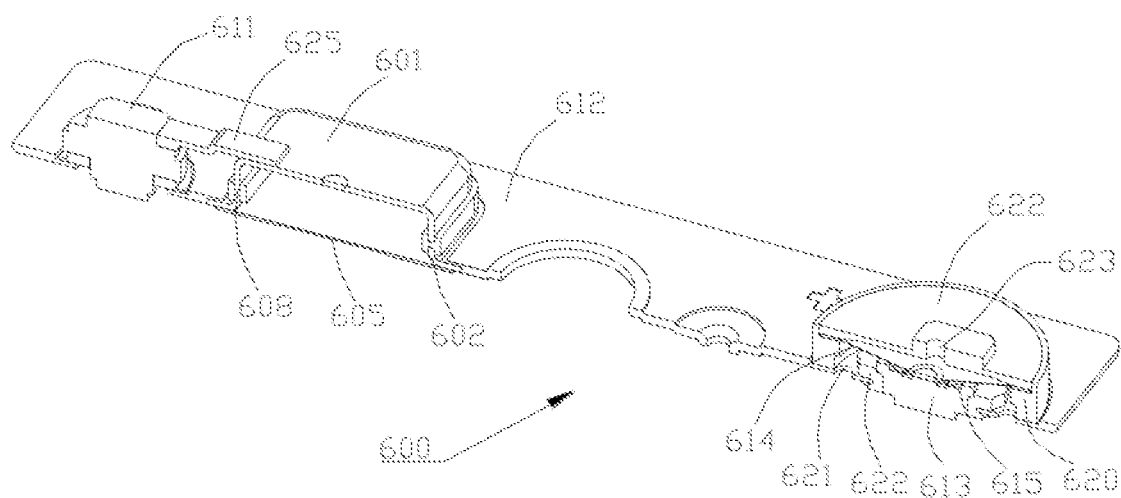
FIG. 18 is a partial three-dimensional view of longitudinal section of a battery cell according to the sixth implementation of the present disclosure.
Figure 19:
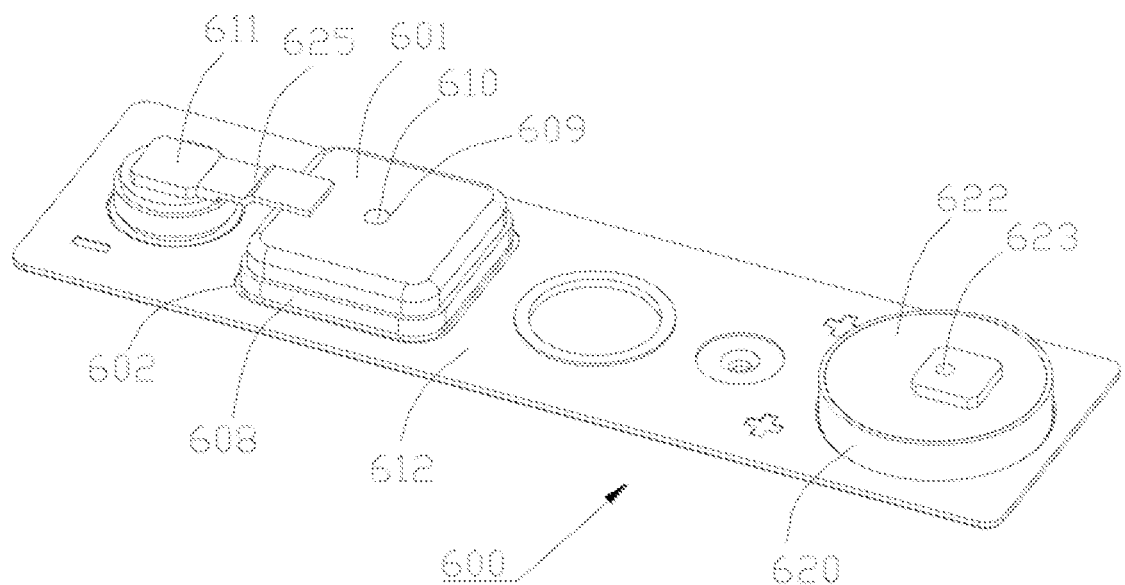
FIG. 19 is a partial three-dimensional view of a battery cell according to the sixth implementation of the present disclosure.

Further, to ensure that the hood structure is stably mounted on the cover plate, and facilitate the gas-producing medium to be connected to a positive or negative electrode of the battery, as shown in FIG. 18 and FIG. 19, the second polar member 602 is fixed on the cover plate to be electrically connected to the positive electrode of the battery or the negative electrode of the battery by using the cover plate.

Further, to prolong the service life of the cover plate, as shown in FIG. 15, FIG. 18 and FIG. 19, the cover plate is provided with a mounting hole, and the second polar member 602 is mounted on the inner wall of the mounting hole, so that the opening of the hood structure faces the inside of the battery. In this way, when damaged, the pressure relief member can be replaced with a new pressure relief member on the second polar member 602 without damaging the structure of the cover plate, so as to improve the service life of the cover plate. Definitely, in another variant, the cover plate may alternatively be used as the second polar member, and the first polar member as a whole forms the hood structure, and is sealed on the cover plate to form the sealed chamber.

To facilitate the electrical connected between the first polar member and the battery, the first polar member is electrically connected to the electrode terminal having the cover plate uncovered by using a conductive connector sheet 625. Further, to prevent the overall height of the battery cell from being elevated, the outer end surface of the hood structure is designed to be basically flat with the outer end surface of the electrode terminal having the cover plate uncovered or slightly lower than the outer face of the battery post, and the battery post and the hood structure are disposed to be spaced from each other along an extending direction of the cover plate of the battery. In this way, without increasing the overall height of the battery, the internal space of the sealed chamber 603 is increased, thereby increasing the amount of filling of the gas-producing medium 604, and improving the gas-producing sensitivity.

In this implementation, the first polar member 601 and the second polar member 602 can form the hood structure in various manners. The first polar member 601 and the second polar member 602 may be combined in a left and right butting manner. For facilitating the sealing of a butting end between the first polar member 601 and the second polar member 602, as shown in FIG. 15, the first polar member 601 and the second polar member 602 may form the hood structure in a vertical stack-up manner.

Specifically, as shown in FIG. 15 and FIG. 18, a ring-shaped insulation strip 608 with the cross-section having an H-shaped structure is included between the first polar member 601 and the second polar member 602, to have the first polar member 601 insulated from the second polar member 602. The hood structure includes a cover body structure as the first polar member 601, and a cover periphery structure as the second polar member 602. The edges at which the cover body structure and the cover periphery structure are close to each other are respectively embedded and sealed into the U-shaped groove at the opposite ends of the H-shaped structure, and the outer periphery of the cover periphery structure is fixedly connected to the cover plate. In this way, the first polar member 601 and the second polar member 602 are respectively embedded into the U-shaped groove, so that the reliability of insulation and sealing between the first polar member 601 and the second polar member 602 is ensured.

The ring-shaped insulation strip 608 can be assembled between the first polar member 601 and the second polar member 602. To reduce assembly time of the current interrupt structure, the ring-shaped insulation strip 608 is integrally formed on the first polar member 601 and the second polar member 602. Specifically, the ring-shaped insulation strip 608 can be integrally formed between the first polar member 601 and the second polar member 602 by means of injection molding.

To facilitate the operation of injecting the gas-producing medium to the sealed chamber, as shown in FIG. 15 and FIG. 19, the cover body structure is provided with a medium injection hole 609, and a sealing plug 610 is blocked on the medium injection hole 609. In this way, after the current interrupt structure is assembled on the battery, the solution is injected from the outside of the battery, and the solution injection manner is more flexible and easier to operate.

For facilitate the spatial layout, and simplifying the components of the current interrupt structure, the first electrode terminal 611 and the second electrode terminal 613 are mounted on the cover plate. The first polar member 601 is disposed close to the first electrode terminal 611 of the battery, and is electrically connected to the first electrode terminal 611. The cover plate 612 is electrically connected to the second electrode terminal 613 of the battery. The current interrupt structure is mounted on the first electrode terminal 611 or the second electrode terminal 613. In this way, an electrical connection relationship between the first polar member 601 and the first electrode terminal 611 is easier to be established. In addition, the second polar member 602 can be electrically connected to the second electrode terminal 613 through the cover plate, so that the gas-producing medium is electrically connected to the positive electrode of the battery or the negative electrode of the battery, thereby simplifying the overall structure of the battery cover assembly.

Specifically, in an implementation in which a hood structure is surrounded by the first electrode terminal 611 and the second electrode terminal 613, as shown in FIG. 15, FIG. 18 and FIG. 19, the cover body structure is electrically connected to the first electrode terminal 611 by using a conductive connector sheet 625. In addition, the cover periphery structure is fixed on the cover plate 612 of the battery, to establish an electrical connection relationship with the second electrode terminal 613 by using the cover plate.

Figure 17:
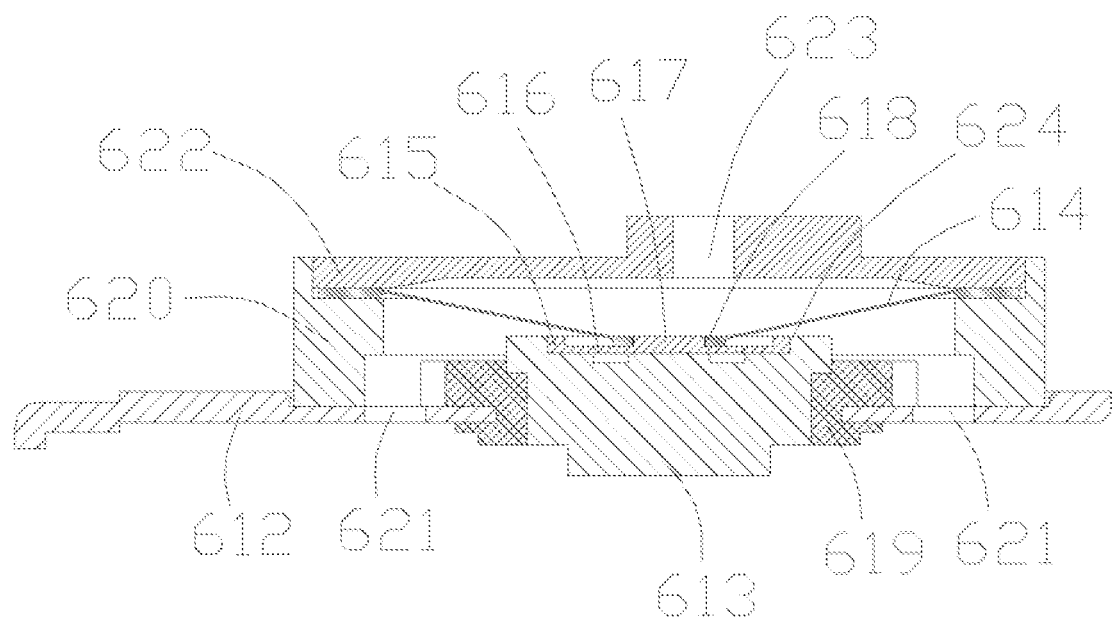
FIG. 17 is a partial cross-sectional view of a battery cell located in another position according to the sixth implementation of the present disclosure.

Similar to the first implementation and the second implementation, as shown in FIG. 17 and FIG. 18, the current interrupt structure further includes a flipping member 614 electrically connected between the electrode inner terminal and the electrode outer terminal. The outer periphery of the flipping member 614 is connected in a sealed and insulating manner to the cover plate. The gas in a sealing package communicates with the gas in the inner surface of the flipping member, so that the flipping member 614 acts to disrupt the electrical connection to the electrode inner terminal under the action of the pressure of the gas. A conductive member 615 is fixed on an outer end surface of the electrode inner terminal, the flipping member 614 is electrically connected to the conductive member 615, the conductive member 615 is provided with a notch 616 which can be broken under the action of the pressure of the gas, and the notch 616 is disposed surrounding a connection point configured to connect to the flipping member 614. One of the flipping member 614 and the conductive member 712 is provided with a boss 617 and the other one is provided with a connection hole 618 configured to accommodate the boss 617, the boss 617 being connected to the connection hole 618 through an annular welding point. In this way, the gas pressure of the gas can be timely sensed when the gas flows from the sealed chamber to the inside of the battery, so as to disrupt the electrical connection between the electrode inner terminal and the electrode outer terminal.

Further, to achieve stable sealing assembly of the flipping member and protection of the current interrupt structure, the flipping member 614 is further covered by a cover member 622, and the cover member 622 is electrically connected to the flipping member 614 to form the electrode outer terminal. In this way, the cover member 622 may be used as the electrode outer terminal, that is, a terminal boss may be disposed to establish a current loop with the outside through a connection member such as an electrode lead-out plate. For example, neighboring battery cells or neighboring battery modules may be connected through the electrode lead-out plate.

In addition, the outer periphery of the cover member can be sealedly connected to the seal ring 620. To achieve the gas leakage, the cover member 622 is provided with a vent hole 623 communicating with the outside. Moreover, the vent hole in the cover member may further enable the current interrupt structure to have a pressure difference with the atmospheric air directly, so that an action of the flipping member is achieved.

In the present disclosure, to interrupt the current transfer of the battery by the current interrupt structure under the action of the gas produced by the gas-producing medium, as shown in FIG. 17, the cover plate 612 of the battery is provided with a through hole for the second electrode terminal 613 to pass therethrough. The second electrode terminal 613 is fixed on the cover plate 612 by using an insulation ring 619 passing through the through hole, so as to be insulated from the cover plate 612. The outer periphery of the flipping member 614 sealed and electrically connected to the cover plate 612 by using a seal ring 620 surrounding the insulation ring 619, and the cover plate 612 is provided with a gas hole 621 located between the seal ring 620 and the insulation ring 619. That is, the second electrode terminal 613 is electrically connected to the cover plate 612 by passing through the conductive member 615, the flipping member 614 and the seal ring 620 in turn, and is insulated from the second electrode terminal 613 by using the insulation ring 619. In addition, the cover plate 612 is provided with the gas hole 621 communicating the flipping member 614 with the inside of the battery. In this way, when the battery is overcharged and produces gas, the gas-producing medium 604 decomposes to produce gas under the action of the voltage difference between the first polar member 601 and the second polar member 602, and then the gas pressure in the sealed chamber 603 is increased. In this case, under the action of a certain gas pressure, the pressure relief member 605 relieves pressure, and the gas enters the battery and communicates with the flipping member 614. The gas pressure inside the battery continues to rise until the electrical connection between the conductive member 615 and the flipping member 614 is disrupted, so that the second electrode terminal 613 cannot establish an electrical connection with the seal ring 620 and the cover plate 612, that is, the flipping member 614, the seal ring 620 and the cover plate 612 not electrified, thereby interrupting the current transfer of the battery.

The battery cover assembly according to the sixth implementation of the present disclosure is described above. A current interrupt assembly provided by the seventh implementation of the present disclosure is described below with reference to FIG. 21 to FIG. 25.

As shown in FIG. 21 to FIG. 25, the current interrupt structure 700 includes a cover plate, an electrode inner terminal and an electrode outer terminal, the electrode inner terminal is electrically connected to the electrode outer terminal through a current interrupt structure mounted on the cover plate, and the battery cover assembly further includes a first collector lead-out plate 705 and a second collector lead-out plate 709 that are configured to electrically connect to positive and negative electrodes of a cell, and a sealed package 704 configured to fill a gas-producing medium and located at an inner side of the cover plate. The sealed package is provided with a first polar member 701 and a second polar member 702 that respectively come into contact with the gas-producing medium. The first polar member is electrically connected to the first collector lead-out plate. The second polar member is electrically connected to the second collector lead-out plate. When a voltage difference between the first polar member 701 and the second polar member 702 exceeds a rated value, the gas-producing medium is capable of producing gas and tearing the sealed package 704 under the action of the pressure of the gas, to make the gas spill out from the sealed package 704 and communicate to the current interrupt structure, to disrupt the electrical connection between the electrode inner terminal and the electrode outer terminal under the action of the pressure of the gas. That is, a difference from the battery cover assembly in the foregoing other implementations lies in that a sealed chamber in the present disclosure is surrounded by the sealed packages. In this way, the structure of the sealed package capable of decomposing to produce the gas can be separately produced and assembled to a battery cell, without needing to use the mechanical part of the battery cell to define the sealed chamber, thereby simplifying the assembly process of the battery cell and simplifying the overall structure of the battery cell.

Figure 21:
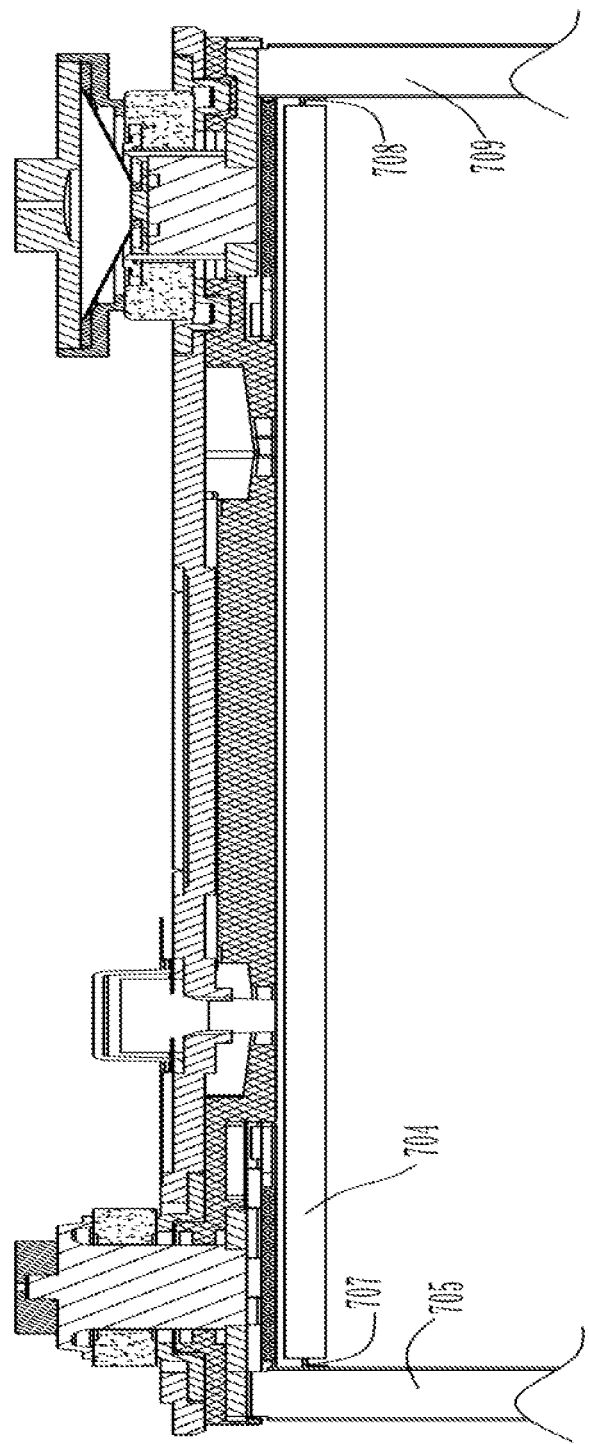
FIG. 21 is a partial cross-sectional view of longitudinal section of a battery cell according to the seventh implementation of the present disclosure.
Figure 22:
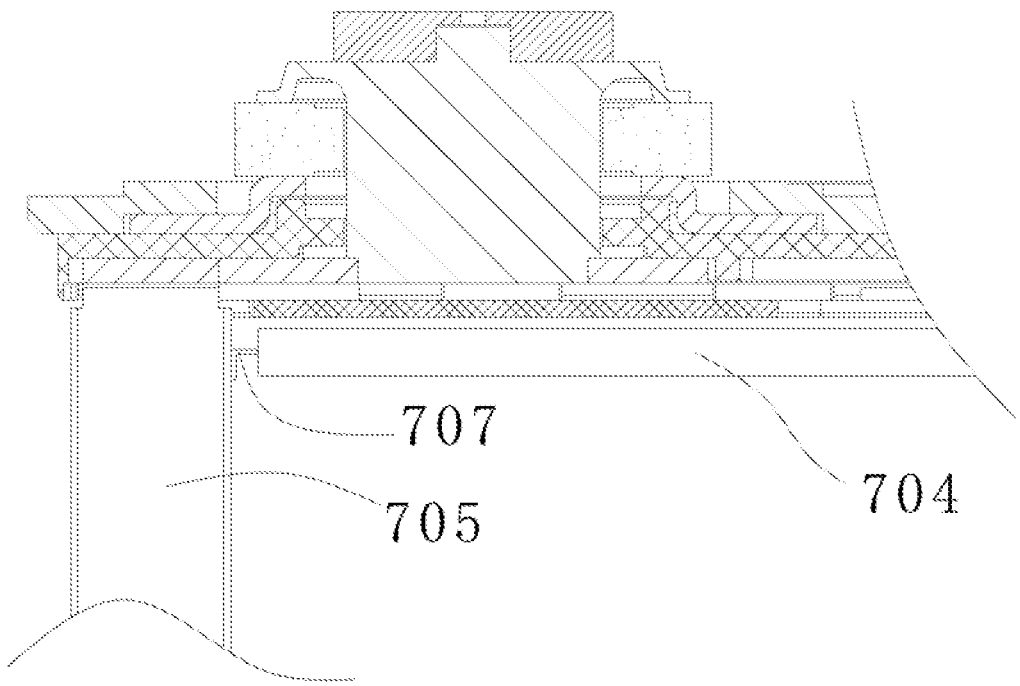
FIG. 22 is a partial schematic view at a left end of FIG. 21.
Figure 23:
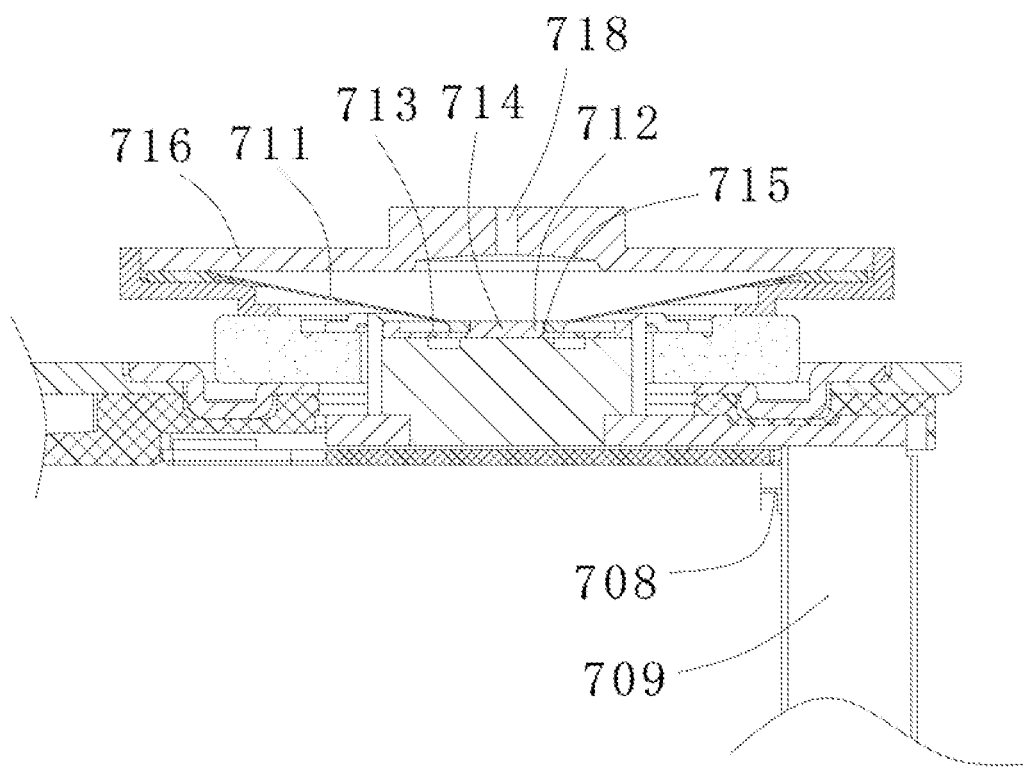
FIG. 23 is a partial schematic view at a right end of FIG. 21.

Different from the manner in which the sealed chamber is formed in the foregoing first to fifth implementations, in this implementation, the sealed package surrounding the sealed chamber is independent of the current interrupt structure. Therefore, when the battery cell is in a normal state, as shown in FIG. 21 to FIG. 23, the gas-producing medium in the sealed package does not react, has a good chemical stability and does not generate the gas. In this case, the sealed package is in a sealed state; therefore, the battery cell can normally perform a charging and discharging operation. However, when the battery cell is close to a dangerous state, for example, the battery is in an early thermal runaway, the gas-producing medium 703 can decompose to produce a large quantity of gas, to tear the sealed package 704 under the action of the pressure of the gas. In this case, the sealed package is in a non-sealed state, to disrupt the electrical connection between the electrode inner terminal and the electrode outer terminal through the current interrupt structure under the action of the pressure of the gas.

Figure 24:
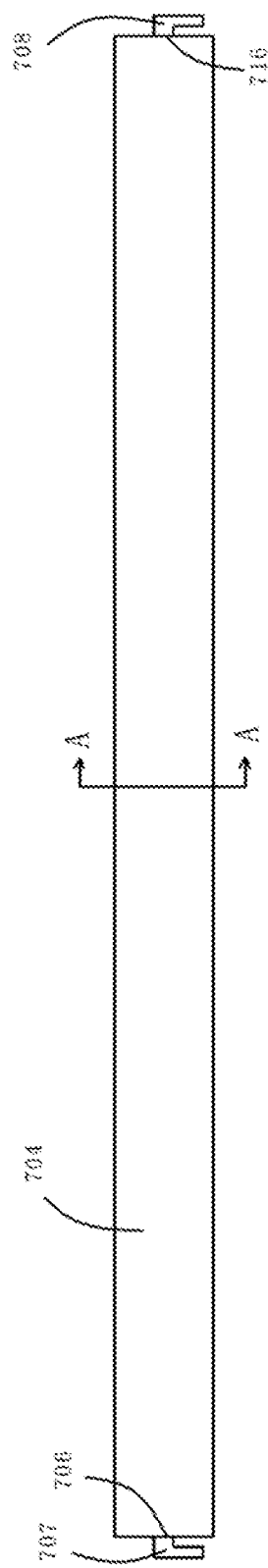
FIG. 24 is a schematic side view of a sealed package according to the seventh implementation of the present disclosure.
Figure 25:
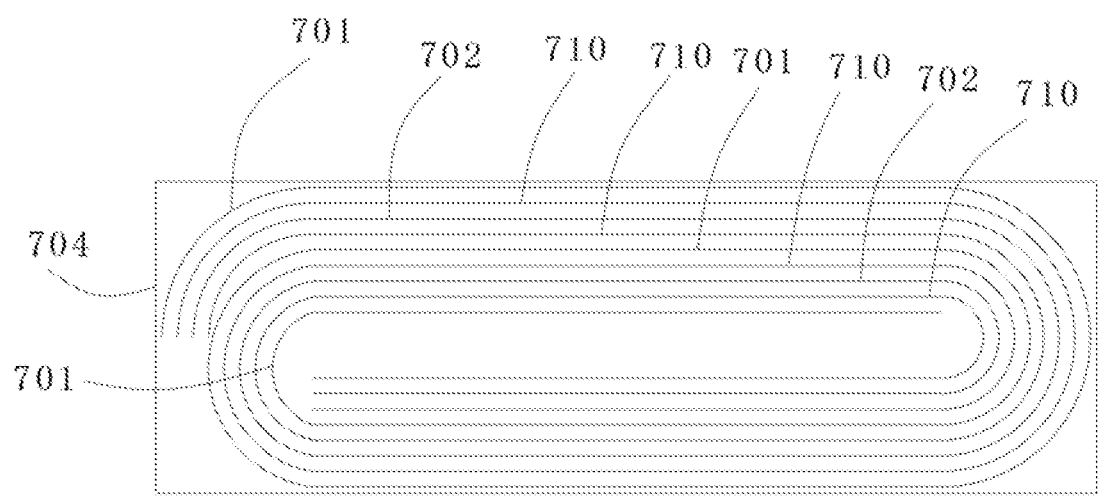
FIG. 25 is a schematic cross-sectional view taken along line A-A in FIG. 24.

In the battery cover assembly in the seventh implementation, to facilitate the processing of the sealed package 704, as shown in FIG. 24 and FIG. 25, the sealed package 704 may be formed as an encapsulation pack, and an encapsulated opening of the encapsulated pack is configured as a weak point that can be tore under the action of the pressure of the gas. In this way, when under the action of the pressure of the gas, the gas begins to accumulate in the sealed package 704, and the pressure of the gas increases, so that the weak point is first tore, and the gas in the sealed package is released inside the battery, to disrupt the electrical connection between the electrode inner terminal and the electrode outer terminal through the current interrupt structure under the action of the pressure of the gas. Specifically, the sealed package may further be made of a material such as an aluminum plastic film that does not dissolve in an electrolyte. In other deformation manners, the weak point that can be tore under the action of the pressure of the gas may also be a notch structure that is formed at a position whose thickness is less than that of the other areas and that is on the sealed package.

To facilitate the full contact between the first polar member 701 and the second polar member 702 and the gas-producing medium and facilitate the electrical connection of the first polar member 701 and the second polar member 702 to the positive and negative electrodes of the battery, as shown in FIG. 24 and FIG. 25, the first polar member 701 and the second polar member 702 are both located at an inner side of the sealed package. Specifically, as shown in FIG. 24, the first polar member 701 includes a first tab 707 passing through the sealed package 704; the second polar member 702 includes a second tab 708 passing through the sealed package 704. The first tab 707 is welded to the first collector lead-out plate 705 of the battery, to build an electrical connection relationship between the first polar member 701 and the first collector lead-out plate 705, and the second tab 708 is welded to the second collector lead-out plate 709 of the battery, to build an electrical connection relationship between the second polar member 702 and the second collector lead-out plate 709, thereby achieving the connection of the gas-producing medium in the sealed package to the positive and negative electrodes of the battery. The first tab 707 and the second tab 708 may be respectively welded to the first polar member 701 and the second polar member 702. For the purpose of simplifying the assembly process, the first tab 707 and the second tab 708 may respectively be integrally formed on the first polar member 701 and the second polar member 702, for example, by integrally forming a tab structure on the first polar member 701 and the second polar member 702. In this way, by disposing both the first polar member 701 and the second polar member 702 inside the sealed package, a contact area between the gas-producing medium and the first polar member 701 and the second polar member 702 can be increased, thereby improving a gas-producing sensitivity of the gas-producing medium. In addition, as long as the first polar member 701 and the second polar member 702 are partially sealed in the sealed package, the first polar member 701 and the second polar member 702 can come into contact with the gas-producing medium in the sealed package. Therefore, in other deformation manners, the first polar member 701 and the second polar member 702 may further pass through the sealed package to connect to the positive and negative electrodes of the battery, that is, the part of the first polar member 701 and the second polar member 702 are located in the inner side of the sealed package.

Further, to facilitate the processing of the sealed package, the sealed opening includes a first sealed opening 706 and a second sealed opening 716 that are located at two opposite ends of the sealed package 704. The first tab 707 passes through and is sealedly connected to the first sealed opening 706. The second tab 708 passes through and is sealedly connected to the second sealed opening 716. In this way, the first sealed opening 706 and the second sealed opening 716 have functions of a pressure relief opening and for mounting the tab, thereby simplifying the structure of the sealed package 704.

Specifically, to facilitate the spatial layout, the sealed package forms a stripe structure extending along a length direction of the battery, and the first sealed opening 706 and the second sealed opening 716 are respectively located at different end portions of the stripe structure. In this way, an extension direction of the stripe structure and the length direction of the battery are the same, so that the space inside the battery can be fully used and the stripe does not occupy too much space inside the battery and does not have adverse effects on components inside the battery.

To facilitate the firm fixing of the sealed package to the first collector lead-out plate 705 and the second collector lead-out plate 709, as shown in FIG. 24, the first tab 707 and the second tab 708 are each formed as an L-shaped conductive plate having a horizontal segment and a vertical segment. A vertical segment of the first tab 707 is attached and fixed to the first collector lead-out plate 705. A vertical segment of the second tab 708 is attached and fixed to the second collector lead-out plate 709. The horizontal segments of the first tab 707 and the second tab 708 are respectively connected to the first polar member 701 and the second polar member 702. In this way, the stripe structure can be perpendicularly connected between the collector lead-out plates at two sides of the battery. The vertical segment provides a full contact between the collector lead-out plates and the tab, thereby firmly fixing the sealed package to the collector lead-out plate.

To prevent the occupation of too much space inside the battery by the sealed package, and ensure a reliable structural strength of the sealed package, as shown in FIG. 25, the first polar member 701 and the second polar member 702 are respectively formed as a first controller conductive plate and a second controller conductive plate having opposite polarities. An inner side of the sealed package further includes an insulator 710. The first collector conductive plate, the insulator 710, and the second collector conductive plate are sequentially stacked and wound, to form a flat structure extending along the length direction of the battery. In this way, the insulator is disposed between the first collector conductive plate and the second collector conductive plate and wound to form the flat structure extending along the length direction of the battery. On the one hand, the flat structure can increase the entire structural strength of the sealed package, and on the other hand, the flat structure extends along the length direction of the battery, to fully use the space inside the battery and prevent the occupation of too much space inside the battery, making the structure of the sealed package more compact.

It should be noted that, an internal structure of the sealed package provided in this implementation is basically the same as an internal structure of a lithium ion battery in the prior art. The components inside the lithium ion battery in the prior art may also be applied to the structure of the sealed package in this implementation without departing from the concept of the present disclosure. Only the difference between the two is described herein. Specifically, in this implementation, similar positive and negative electrode materials coated on the positive and negative electrodes of the lithium ion battery do not need to be disposed on the first polar member 701 and the second polar member 702. In addition, the sealed package of the present disclosure is filled with the above solution including the gas-producing medium, and therefore has a different composition from that of the electrolytic solution inside the lithium ion battery in the prior art.

Based on this, in an example implementation, the first collector conductive plate may be, for example, a copper foil and the second collector conductive plate may be, for example, an aluminum foil. The insulator may be, for example, a polyethylene (PE) composite film or a polypropylene (PP) composite film.

In addition, a manufacturing method of the sealed package provided in the present disclosure is basically the same as a manufacturing method of the lithium ion battery. Only one manufacturing method is briefly described herein. Specifically, the insulator may be disposed between the first collector conductive plate such as a copper foil and the second collector conductive plate such as an aluminum foil, which are not coated with the positive and negative electrode materials, and then the insulator, the first collector conductive plate, and the second collector conductive plate may be wound as a conductive core structure similar to the lithium ion battery. For example, the conductive core structure is sealed by the aluminum plastic film and includes two tabs respectively welded to the collector lead-out plates of the battery, thereby achieving parallel connection with an external battery cell. In addition, the aluminum plastic film is injected with the solution formed by mixing a lithium salt, an organic solvent and the gas-producing medium, so that the gas-producing medium can decompose to produce the gas under a rated voltage. In this way, when the voltage difference between the first polar member 705 and the second polar member 706 exceeds the rated value, the gas-producing medium generates a large quantity of gas, to open the sealed opening of the aluminum plastic film, and the gas is released from the sealed package, thereby forcing the mechanical structure to disrupt a current transfer of the battery, achieving an open circuit between the battery and an external circuit and improving the battery safety. For example, the mechanical structure may be an explosion proof vent disposed on the battery.

Similar to the first implementation and the second implementation, as shown in FIG. 21 and FIG. 23, the current interrupt structure may further include a flipping member 711 electrically connected between the electrode inner terminal and the electrode outer terminal, an outer periphery of the flipping member is connected in a sealed and insulating manner to the cover plate, and the sealed package is in gas communication with an inner surface of the flipping member, so that under the action of the pressure of the gas, the flipping member acts to disrupt the electrical connection with the electrode inner terminal. A conductive member 712 is fixed on an outer end surface of the electrode inner terminal, the flipping member 711 is electrically connected to the conductive member 712, the conductive member 712 is provided with a notch 713 which can be broken under the action of the pressure of the gas, and the notch 713 is disposed surrounding a connection point configured to connect to the flipping member 711. One of the flipping member 711 and the conductive member 712 is provided with a boss 714 and the other one is provided with a connection hole 715 configured to accommodate the boss 714, the boss 714 being connected to the connection hole 715 through an annular welding point. Therefore, the pressure of the gas flown from the sealed package to the inside of the battery can be sensed in time, to disrupt the electrical connection between the electrode inner terminal and the electrode outer terminal.

Further, to achieve stable sealed assembly of the flipping member and protection of the current interrupt structure, the flipping member 711 is further covered by a cover member 716, and the cover member 716 is electrically connected to the flipping member 711 to form the electrode outer terminal.

To achieve the foregoing gas releasing, the cover member 716 is provided with a vent hole 718 communicating with the outside.

Although preferred implementations of the present disclosure are described in detail above with reference to the accompanying drawings, the present disclosure is not limited to specific details in the foregoing implementations. Various simple variations can be made to the technical solutions of the present disclosure within the scope of the technical idea of the present disclosure, and such simple variations all fall within the protection scope of the present disclosure.

It should be further noted that the specific technical features described in the foregoing specific implementations can be combined in any appropriate manner provided that no conflict occurs. To avoid unnecessary repetition, various possible combination manners will not be described in the present disclosure. In addition, various different implementations of the present disclosure may alternatively be combined randomly. Such combinations should also be considered as the content disclosed in the present disclosure provided that these combinations do not depart from the concept of the present disclosure.

What is claimed is:

1. A battery cover assembly, comprising a cover plate, an electrode inner terminal and an electrode outer terminal, wherein the electrode inner terminal is electrically connected to the electrode outer terminal through a current interrupt structure disposed on the cover plate, the current interrupt structure comprises a sealed chamber configured to fill a gas-producing medium therein, the sealed chamber is configured to make the gas-producing medium to be electrically connected to positive electrodes and negative electrodes of a battery, and when a voltage difference between the positive electrodes and the negative electrodes of the battery exceeds a rated value, the gas-producing medium produces gas, to disrupt the electrical connection between the electrode inner terminal and the electrode outer terminal under an action of a pressure of the gas.

2. The battery cover assembly according to claim 1, wherein the rated value is in a range of 4.5 V to 5 V.

3. The battery cover assembly according to claim 1, wherein the gas-producing medium comprises at least one of biphenyl, tert-amylbenzene, cyclohexylbenzene, terphenyl, cyclohexyl biphenyls or dibenzofuran.

4. The battery cover assembly according to claim 1, wherein the battery cover assembly comprises a first polar member and a second polar member respectively in contact with the gas-producing medium, one of the first polar member and the second polar member is configured to connect to the positive electrode of the battery and the other is configured to connect to the negative electrode of the battery, the first polar member is formed by the electrode inner terminal and insulated from the cover plate, and the second polar member is connected in a sealed and insulating manner to the cover plate.

5. The battery cover assembly according to claim 4, wherein the current interrupt structure further comprises a flipping member configured to serve as a part of a chamber wall of the sealed chamber, the electrode inner terminal and the electrode outer terminal are electrically connected to each other through the flipping member, and under the action of the pressure of the gas, the flipping member acts to disrupt the electrical connection between the electrode inner terminal and the electrode outer terminal.

6. The battery cover assembly according to claim 5, wherein the current interrupt structure further comprises a conductive member, and the conductive member is fixed on an outer end surface of the electrode inner terminal, the flipping member is electrically connected to the conductive member, the conductive member is provided with a notch which can be broken under the action of the pressure of the gas, and the notch is disposed surrounding a connection point configured to connect to the flipping member.

7. The battery cover assembly according to claim 6, wherein one of the flipping member and the conductive member is provided with a boss and the other one is provided with a connection hole configured to accommodate the boss, the boss being connected to the connection hole through an annular welding point.

8. The battery cover assembly according to claim 5, wherein the electrode inner terminal is formed by a battery post extending along a medial-lateral direction, the flipping member is disposed coaxially with the battery post and radially extends outward from the battery post, and a side surface of the battery post is connected in a sealed and insulating manner to an outer periphery of the flipping member, so that the sealed chamber is formed as an annular cavity disposed around an axis of the battery post.

9. The battery cover assembly according to claim 8, wherein an inner end portion of the battery post comprises a radial flange, an outer end surface of the radial flange is sealedly connected with an inner insulation ring, and the cover plate is sealedly connected to an outer end surface of the inner insulation ring so as to be insulated from the battery post.

10. The battery cover assembly according to claim 9, wherein the radial flange is provided with a medium injection hole configured to communicate with the annular cavity.

11. The battery cover assembly according to claim 10, wherein the outer end surface of the radial flange is formed as a step structure, the step structure comprises an inner ring close to the axis of the battery post and an outer ring away from the axis of the battery post, a thickness of the inner ring is greater than a thickness of the outer ring, the inner insulation ring is fixed to the outer ring, and the medium injection hole extends from an inner end surface of the radial flange to the inner ring.

12. The battery cover assembly according to claim 8, wherein the second polar member is formed as an annular conductive sheet surrounding the annular cavity, an inner end surface of the annular conductive sheet is sealedly connected with a first outer insulation ring, the cover plate is sealedly connected to an inner end surface of the first outer insulation ring so as to be insulated from the annular conductive sheet, an outer end surface of the annular conductive sheet is sealedly connected with a second outer insulation ring, and the outer periphery of the flipping member is sealedly connected to an outer end surface of the second outer insulation ring so as to be insulated from the annular conductive sheet.

13. The battery cover assembly according to claim 12, wherein the outer end surface of the second outer insulation ring is sealedly connected with a seal ring, the outer periphery of the flipping member is sealedly connected to the seal ring, the flipping member is further covered by a cover member, and the cover member is electrically connected to the flipping member to form the electrode outer terminal.

14. The battery cover assembly according to claim 13, wherein the cover member is provided with a vent hole communicating with the outside.

15. A battery cell, comprising a housing and a cell accommodated in the housing, wherein the battery cell further comprises the battery cover assembly according to claim 1, the cover plate packages the housing, and the cell is electrically connected to the electrode inner terminal.

16. A battery module, comprising the battery cell according to claim 15 disposed therein.

17. The battery cover assembly according to claim 2, wherein the gas-producing medium comprises at least one of biphenyl, tert-amylbenzene, cyclohexylbenzene, terphenyl, cyclohexyl biphenyls or dibenzofuran.

18. The battery cover assembly according to claim 6, wherein the electrode inner terminal is formed by a battery post extending along a medial-lateral direction, the flipping member is disposed coaxially with the battery post and radially extends outward from the battery post, and a side surface of the battery post is connected in a sealed and insulating manner to an outer periphery of the flipping member, so that the sealed chamber is formed as an annular cavity disposed around an axis of the battery post.

19. The battery cover assembly according to claim 7, wherein the electrode inner terminal is formed by a battery post extending along a medial-lateral direction, the flipping member is disposed coaxially with the battery post and radially extends outward from the battery post, and a side surface of the battery post is connected in a sealed and insulating manner to an outer periphery of the flipping member, so that the sealed chamber is formed as an annular cavity disposed around an axis of the battery post.

* * * * *